United States Patent
Shiratori et al.

[11] Patent Number: 6,027,825
[45] Date of Patent: *Feb. 22, 2000

[54] MAGNETOOPTICAL RECORDING MEDIUM ON WHICH HIGH-DENSITY INFORMATION CAN BE RECORDED AND METHOD OF REPRODUCING THE RECORDED INFORMATION

[75] Inventors: Tsutomu Shiratori, Yokohama; Tomoyuki Hiroki, Zama, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,921

[22] Filed: Jun. 5, 1997

Related U.S. Application Data

[63] Continuation of application No. 08/220,184, Mar. 30, 1994, abandoned.

[30] Foreign Application Priority Data

| Apr. 2, 1993 | [JP] | Japan | 5-077141 |
| Oct. 18, 1993 | [JP] | Japan | 5-259978 |

[51] Int. Cl.[7] ............................................. G11B 5/66
[52] U.S. Cl. ..................... 428/694 ML; 428/694 MT; 428/694 RE; 428/694 MM; 428/694 EC; 428/900; 369/13; 369/14; 369/275.2; 369/275.3; 360/59; 360/114; 360/131; 365/122
[58] Field of Search ..................... 428/694 EC, 694 MT, 428/694 ML, 694 RE, 694 MM, 900; 369/13, 14, 275.2, 275.3; 360/59, 114, 131; 365/122

[56] References Cited

U.S. PATENT DOCUMENTS

| 4,390,600 | 6/1983 | Ohta et al. | 428/621 |
| 5,018,119 | 5/1991 | Aratani et al. | 369/13 |
| 5,168,482 | 12/1992 | Aratani et al. | 369/13 |
| 5,278,810 | 1/1994 | Takahashi et al. | 369/13 |
| 5,343,449 | 8/1994 | Miyata | 369/13 |

FOREIGN PATENT DOCUMENTS

| 258978 | 3/1988 | European Pat. Off. . |
| 0343727 | 11/1989 | European Pat. Off. . |
| 0352548 | 1/1990 | European Pat. Off. . |
| 0492553 | 7/1992 | European Pat. Off. . |
| 0498440 | 8/1992 | European Pat. Off. . |
| 0498461 | 8/1992 | European Pat. Off. . |
| 0522500 | 1/1993 | European Pat. Off. . |
| 0524745 | 1/1993 | European Pat. Off. . |

OTHER PUBLICATIONS

Ohta et al "Read out Mechanism of Magnetically Induced Super Resolution"; *J. Magn. Soc. Jpn.* vol. 15; S1(1991) pp. 319–322.

Fukumoto, et al., "Superresolution of Optical Disks Using a Small Aperture," Japanese Journal of Applied Physics Part 1, vol. 31, No. 2B, Feb. 1992, Tokyo, Japan, pp. 529–533.

Kaneko, et al., "Multilayered Magneto–Optical Disks for Magnetically Induced Superresolution," Japanese Journal of Applied Physics Part 1, vol. 31, No. 2B, Feb. 1992, Tokyo, Japan, pp. 568–575.

Yoshimura, el al., "Large–capacity Magneto–optical Disk System Using Magnetically Induced Super Resolution," IEEE Transactions on Consumer Electronics, vol. 38, No. 3, Aug. 1992, New York, NY, pp. 660–664.

*Primary Examiner*—Leszek Kiliman
*Attorney, Agent, or Firm*—Fitzpatrick, Cella, Harper & Scinto

[57] ABSTRACT

A magnetooptical recording medium includes a first magnetic layer, a second magnetic layer whose Curie temperature is lower than that of the first magnetic layer, and a third magnetic layer, comprising a vertically-magnetizing film, whose Curie temperature is higher than that of the second magnetic layer. The first magnetic layer, the second magnetic layer and the third magnetic layer are in a state of exchange coupling with each other at a portion of a vertically-magnetizing film. A domain walls formed in the first magnetic layer moves when the temperature of the medium has been raised to at least the Curie temperature of the second magnetic layer.

93 Claims, 23 Drawing Sheets

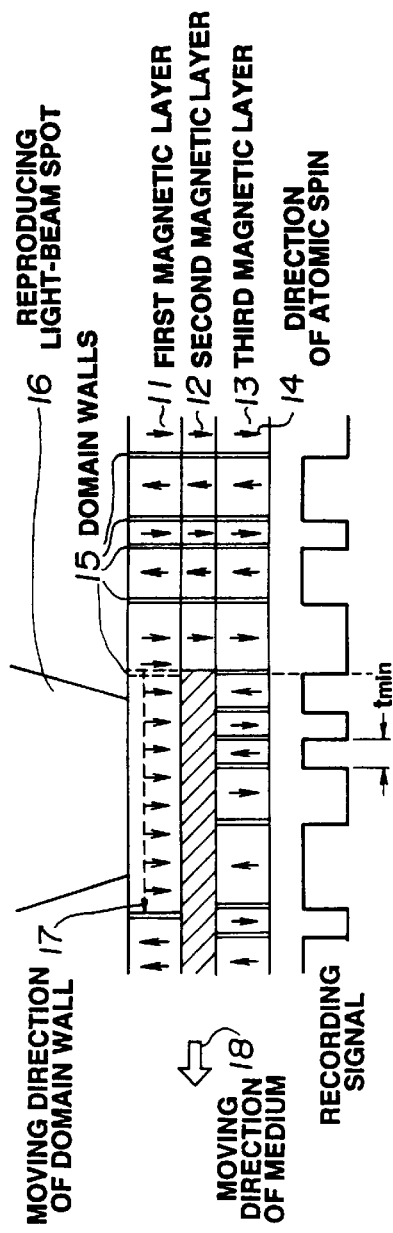
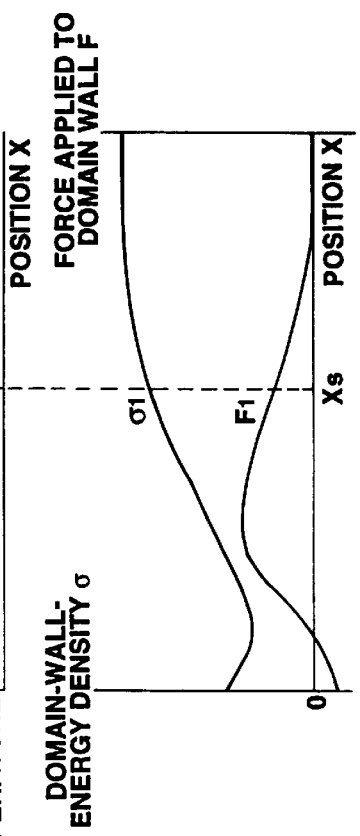
FIG. 1A
FIG. 1B
FIG. 1C

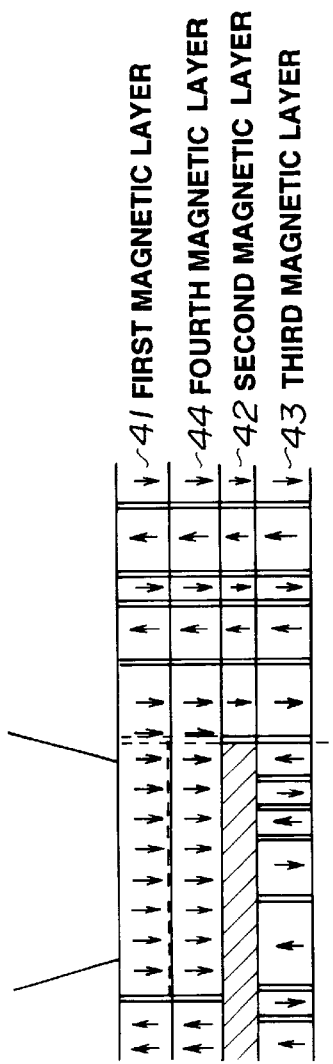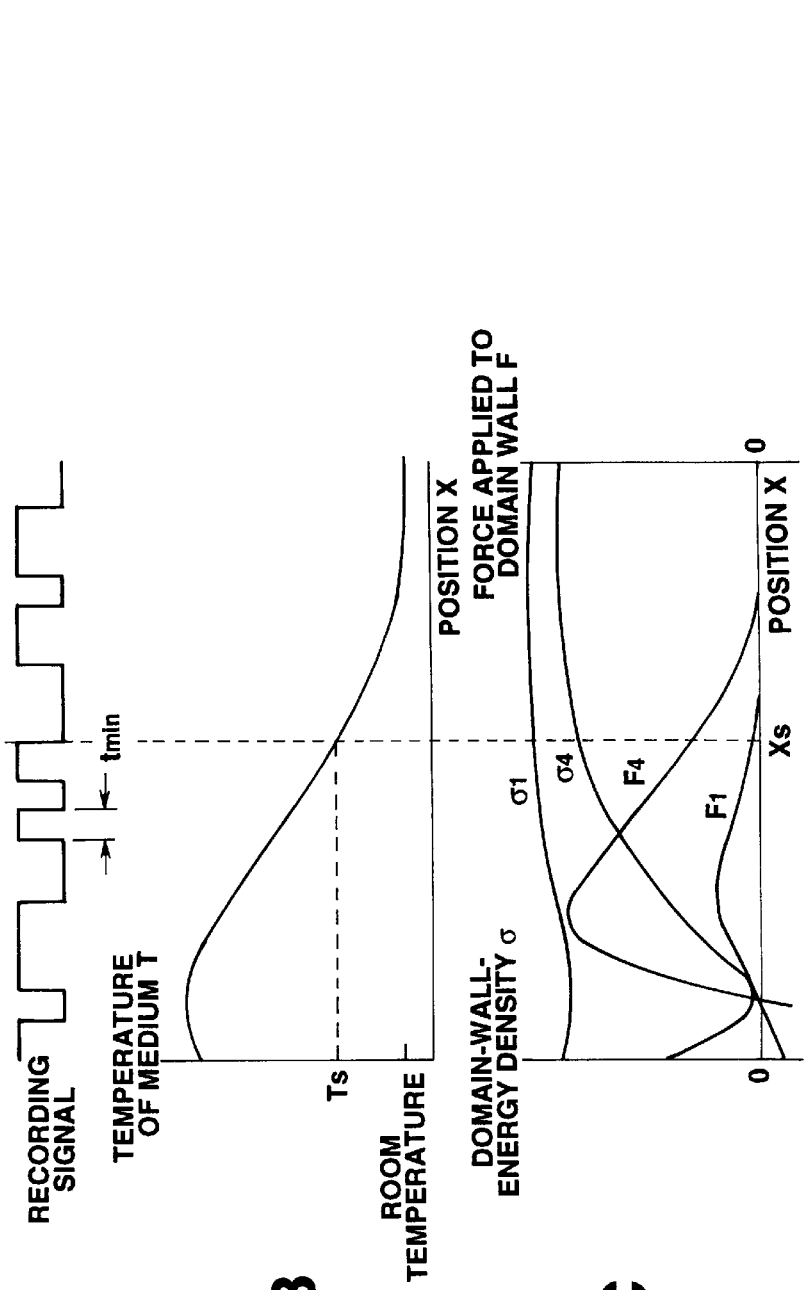
FIG.4A
FIG.4B
FIG.4C

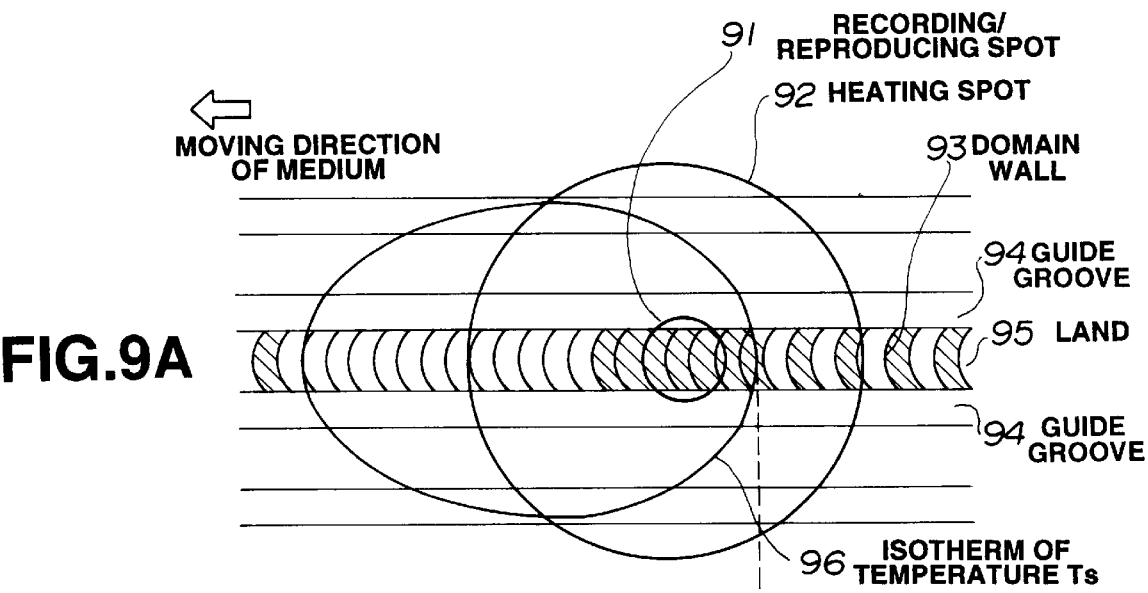
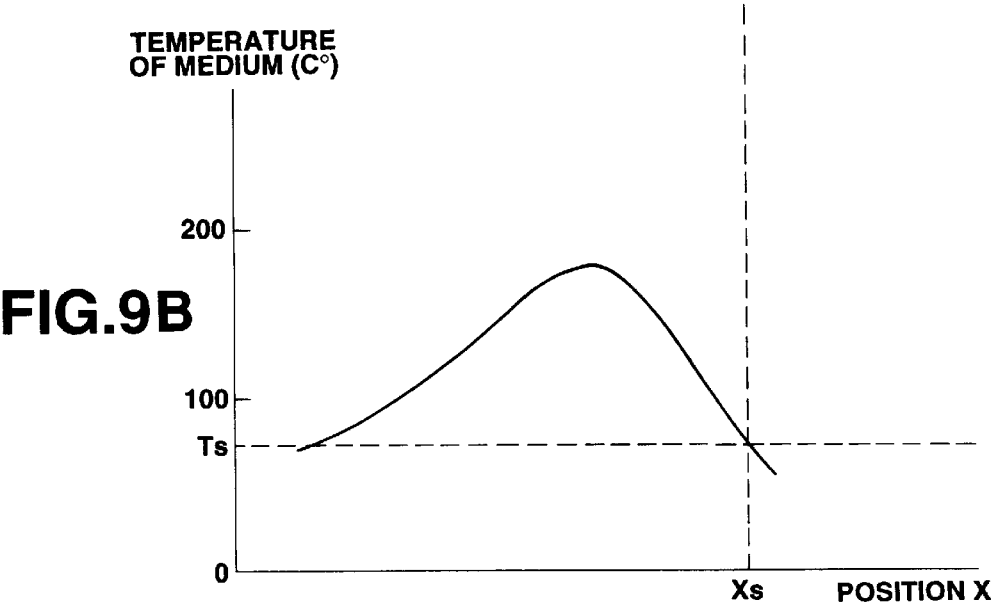

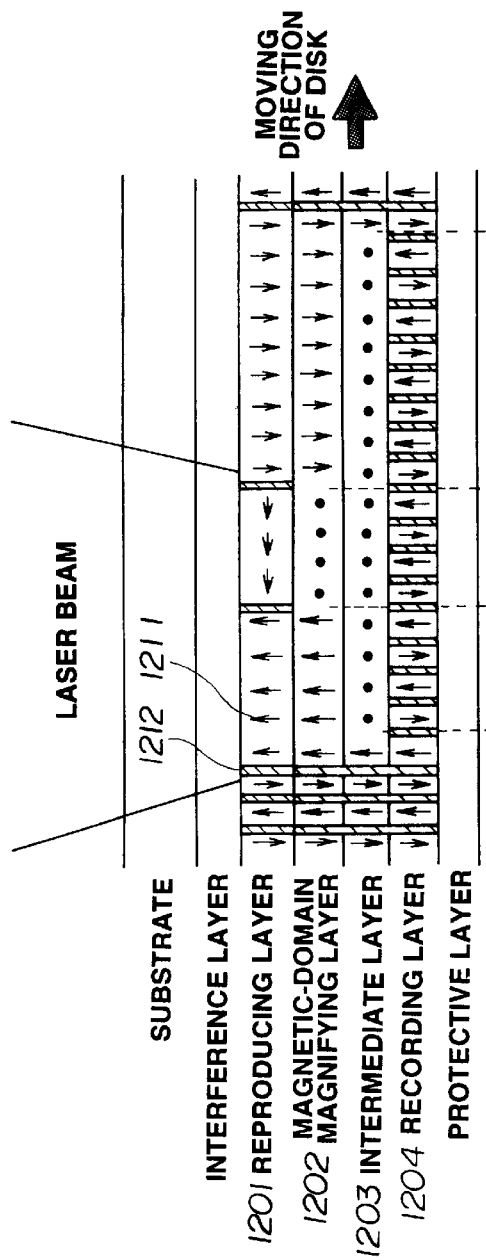
FIG.12A
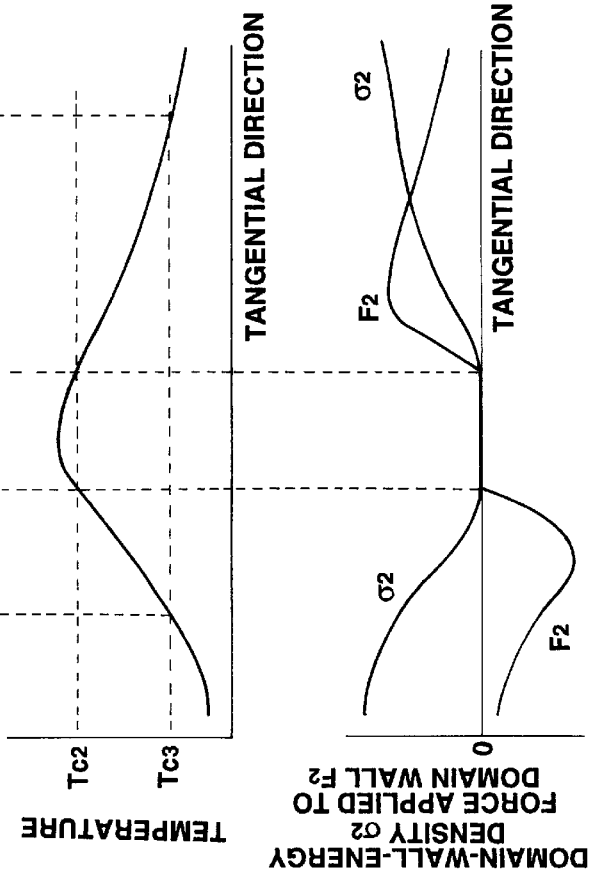
FIG.12B
FIG.12C

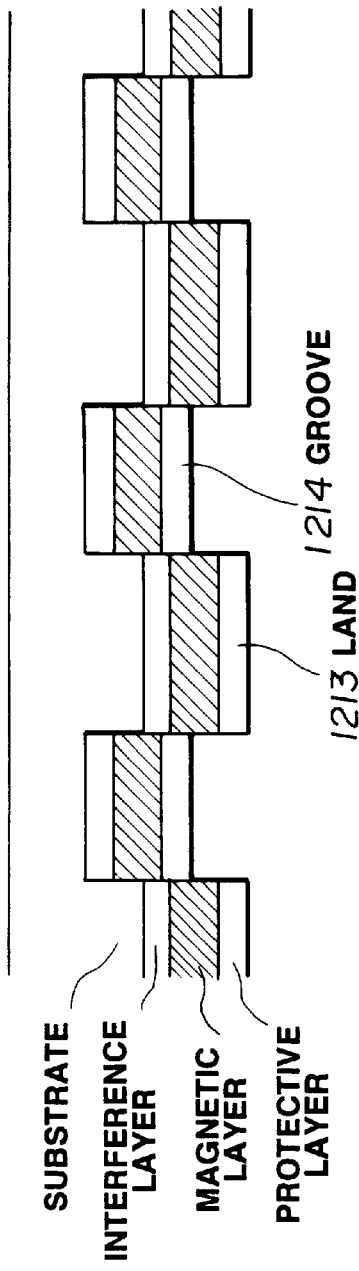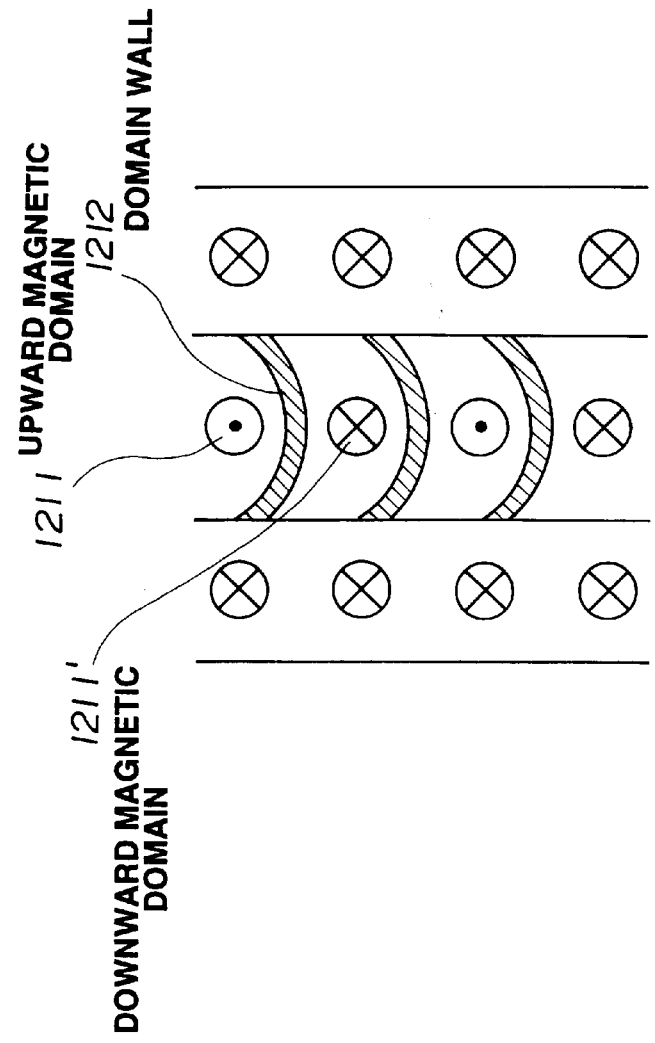
FIG.13A
FIG.13B

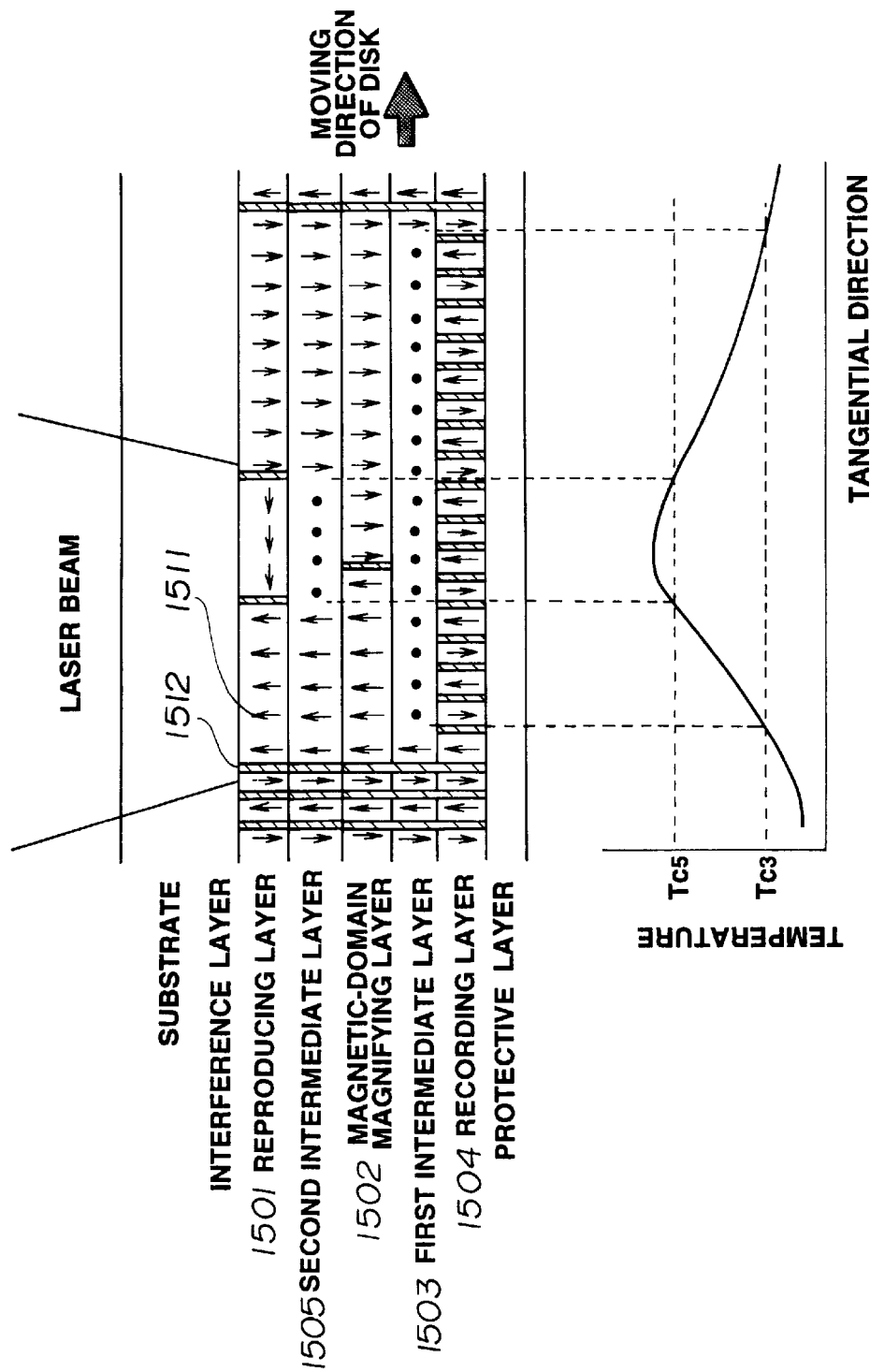

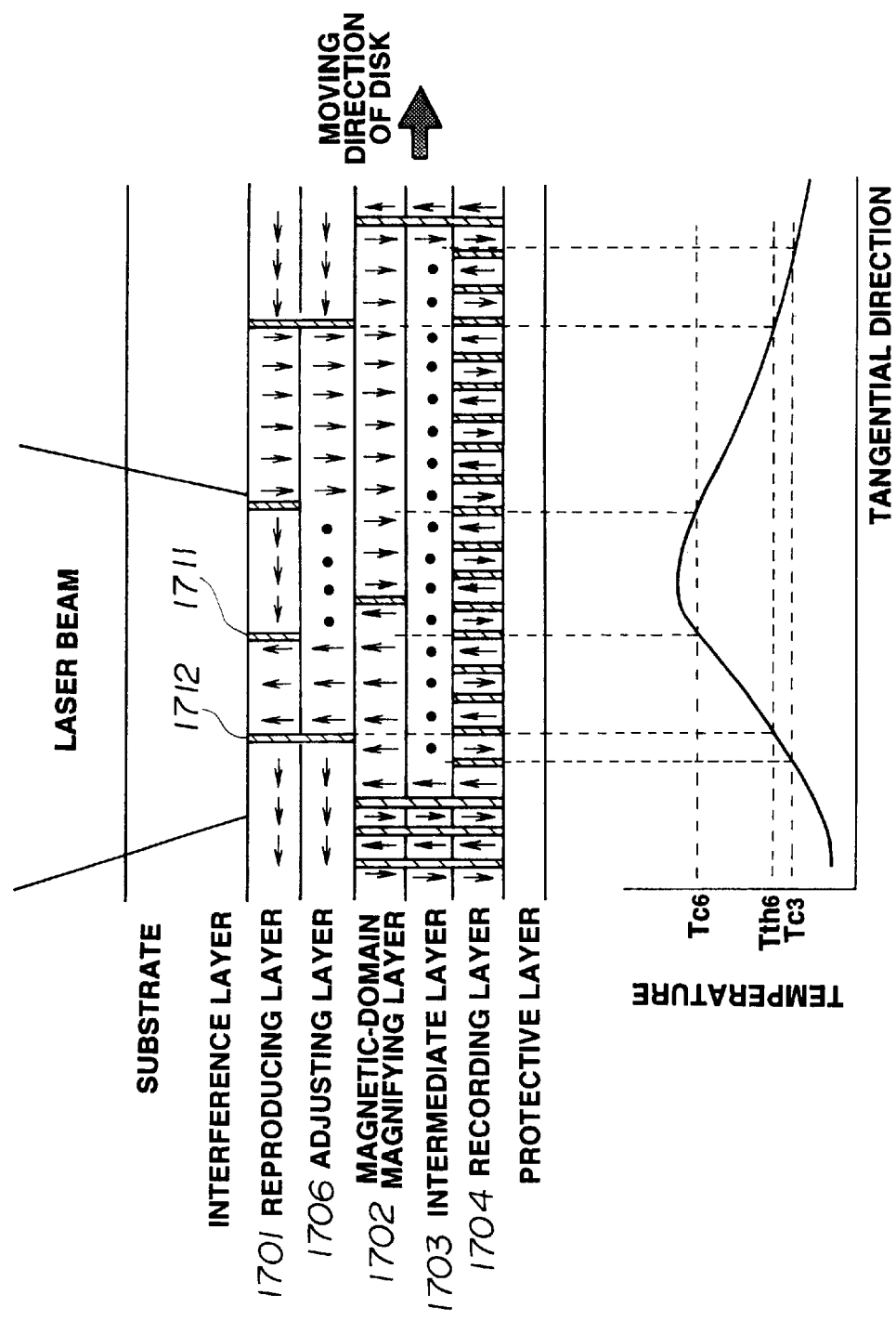

MAGNETOOPTICAL RECORDING MEDIUM ON WHICH HIGH-DENSITY INFORMATION CAN BE RECORDED AND METHOD OF REPRODUCING THE RECORDED INFORMATION

This application is a continuation of application Ser. No. 08/220,184, filed Mar. 30, 1994, now abandoned.

BACKGROUND OF THE INVENTION

1. Field of the Invention

This invention relates to a magnetooptical recording medium for recording/reproducing information using a laser beam utilizing a magnetooptical effect, and more particularly, to a magnetooptical recording medium on which high-density information can be recorded, and a method of reproducing the recorded information.

2. Description of the Related Art

In the field of rewritable high-density recording, magnetooptical recording media have attracted notice, in which information is recorded by writing magnetic domains on a magnetic thin film using the thermal energy of a semiconductor laser, and the information is read using a magnetooptical effect. Recently, there has been an increasing demand for large-capacity recording media by increasing the recording density of the magnetooptical recording media.

The track recording density of an optical disk, such as a magnetooptical disk or the like, greatly depends on the wavelength of the laser beam used in the reproducing optical system, and the numerical aperture of the objective lens used in the system. That is, when the wavelength $\lambda$ of the laser beam used in the reproducing optical system and the numerical aperture N of the objective lens are determined, the diameter of the beam waist is determined. Hence, the detectable limit of the spatial frequency in signal reproduction is about $2NA/\lambda$.

Accordingly, in order to realize high-density recording in a conventional optical disk, the wavelength of the laser beam used in the reproducing optical system must be shortened, and the numerical aperture NA of the objective lens must be increased. However, there is a limitation in improving the wavelength of the laser beam and the numerical aperture of the objective lens. Accordingly, techniques have been developed, in which the recording density of a recording medium is increased by improving the configuration of the recording medium and the method of reading information.

For example, in Japanese Patent Laid-open Application (Kokai) No. 3-93058 (1991), a signal reproducing method is proposed, in which a signal is recorded in a recording holding layer in a multiple layers comprising a reproducing layer and the recording holding layer magnetically coupled with each other. After aligning the orientation of magnetization in the reproducing layer, the reproducing layer is heated by projecting a laser beam, the signal recorded in the recording holding layer is transferred to the region whose temperature has been raised, and the transferred signal is read.

According to this method, the region, whose temperature has been raised to a transfer temperature by being heated by the laser beam and from which a signal is detected, can be limited to a smaller region than the spot size of the reproducing laser beam. Hence, interference between codes during a reproducing operation is reduced, so that a signal having a period equal to or less than the diffraction limit of light can be reproduced.

However, in the magnetooptical reproducing method described in Japanese Patent Laid-open Application (Kokai) No. 3-93058 (1991), since the signal detection region which is effectively used is smaller than the spot size of the reproducing laser beam, the amplitude of the reproduced signal is greatly reduced, and therefore a sufficient reproduced signal cannot be obtained.

Moreover, since the magnetization of the reproducing layer must be aligned in one direction before projecting the laser beam, a magnet for initializing the reproducing layer must be added to a conventional apparatus. Hence, the above-described reproducing method has the problems that, for example, the magnetooptical recording apparatus has a complicated configuration, whereby the cost of the apparatus increases, and the size of the apparatus cannot be reduced.

SUMMARY OF THE INVENTION

It is an object of the present invention to solve the above-described problems.

It is another object of the present invention to provide a magnetooptical recording medium and a method of reproducing information from the medium, in which a signal having a period equal to or less than the diffraction limit of light can be reproduced at a high speed without reducing the amplitude of the reproduced signal, so that the recording density and the transfer speed of the medium can be greatly increased, and the size of the reproducing apparatus can be reduced.

According to one aspect, the present invention which achieves these objectives relates to a magnetooptical recording medium comprising a first magnetic layer, a second magnetic layer whose Curie temperature is lower than that of the first magnetic layer, and a third magnetic layer, comprising a vertically-magnetizing layer, whose Curie temperature is higher than that of the second magnetic layer. The first magnetic layer, the second magnetic layer and the third magnetic layer are in a state of exchange coupling with each other at a portion of a vertically magnetizing film. A domain wall formed in the first magnetic layer moves when the temperature of the medium has been raised to at least the Curie temperature of the second magnetic layer.

According to another aspect, the present invention relates to an information reproducing method for reproducing information from a magnetooptical recording medium, comprising a first magnetic layer, a second magnetic layer whose Curie temperature is lower than that of the first magnetic layer, and a third magnetic layer, comprising a vertically magnetizing layer, whose Curie temperature is higher than that of the second magnetic layer, the first magnetic layer, the second magnetic layer and the third magnetic layer being in a state of exchange coupling with each other at a portion of a vertically-magnetizing film, and a domain wall formed in the first magnetic layer moving when the temperature of the second magnetic layer has been raised to at least the Curie temperature of the second magnetic layer, the method comprising the steps of rotating the medium, projecting a light beam onto the rotating medium from the side of the first magnetic layer to form a temperature distribution having a gradient in the moving direction of the light beam and having a region of temperatures equal to at least the Curie temperature of the second magnetic layer, and detecting a change in the plane of polarization of reflected light of the light beam.

The foregoing and other objects, advantages and features of the present invention will become more apparent from the following description of the preferred embodiments taken in conjunction with the accompanying drawings.

BRIEF DESCRIPTION OF THE DRAWINGS

FIGS. 1A through 1C are diagrams schematically illustrating the concept of an information reproducing method, in which a magnetooptical recording medium having first through third magnetic layers is used, according to a first embodiment of the present invention; FIG. 1A illustrates a cross section of the medium in a reproducing state, and schematically illustrates a state of orientation of spins in respective magnetic layers, FIG. 1B illustrates the temperature distribution at positions shown in FIG. 1A on the medium, and FIG. 1C schematically illustrates the distribution of the domain-wall-energy density at the same positions, and the distribution of a force applied to a domain wall in accordance with the distribution of the domain-wall-energy density;

FIGS. 4A through 4C are diagrams schematically illustrating the concept of an information reproducing method, in which a magnetooptical recording medium having first through fourth magnetic layers is used, according to a second embodiment of the present invention;

FIGS. 9A and 9B are diagrams schematically illustrating a reproducing state for the sample of the first experimental example;

FIGS. 12A through 12C are diagrams illustrating a magnetooptical recording medium and the principle of reproducing information from the medium according to a third embodiment of the present invention;

FIGS. 13A and 13B are a cross-sectional view and a plan view, respectively, of the magnetooptical recording medium of the third embodiment;

FIGS. 21A and 21B are diagrams illustrating a magnetooptical recording medium and the principle of reproducing information from the medium according to a sixth embodiment of the present invention;

FIGS. 23A and 23B are diagrams illustrating a magnetooptical recording medium and the principle of reproducing information from the medium according to an eighth embodiment of the present invention.

DESCRIPTION OF THE PREFERRED EMBODIMENTS

First Embodiment

Figure 2:
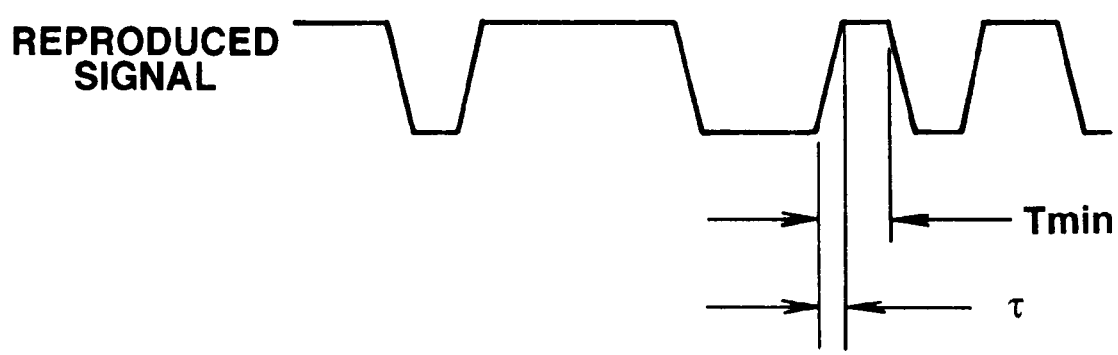
FIG. 2 is a graph illustrating the relationship between the time τ required for a domain wall to pass under a light-beam spot, and the time $t_{min}$ required for the medium to move the distance equal to the shortest recording mark length.

FIG. 1A is a cross-sectional view illustrating the schematic configuration of a magnetooptical recording medium according to a first embodiment of the present invention. The magnetic layer of this medium comprises a first magnetic layer 11, a second magnetic layer 12 and a third magnetic layer 13, which are sequentially laminated. Arrow 14 in each layer indicates the direction of an atomic spin. A domain wall 15 is formed at the boundary of regions in which the directions of spins are inverse to each other. The recording signal for these recording layers is indicated below the cross-section of the medium as a graph.

FIG. 1B is a graph indicating the temperature distribution produced in the magnetooptical recording medium of the first embodiment. This temperature distribution may be provided on the medium by a light beam projected for reproducing the recorded signal. It is preferable, however, to provide the temperature distribution using another heating means so that the temperature of the medium is raised from a portion preceding the reproducing light-beam spot in the moving direction of the spot, and a temperature peak is present behind the spot. At position $x_s$, the temperature of the medium reaches temperature $T_s$, which is close to the Curie temperature of the second magnetic layer.

FIG. 1C is a graph showing the distribution of the domain-wall-energy density $\sigma_1$ of the first magnetic layer, which corresponds to the temperature distribution shown in FIG. 1B. When the domain-wall-energy density $\sigma_1$ has a gradient in the x direction as shown in FIG. 1C, the following force $F_1$ is applied to the domain wall in each layer present at position x:

$$F_1 = \partial\sigma/\partial x.$$

This force $F_1$ is applied so as to move each domain wall toward a side having lower domain-wall energy. Since the first magnetic layer has a small domain-wall coercive force and a large domain-wall mobility, the domain wall is easily moved by the force $F_1$ if only the first magnetic layer is present. However, since the temperature of the medium is lower than $T_s$ at a region preceding position $x_s$ (the right side in FIG. 1C), and the first magnetic layer is in a state of exchange coupling with the third magnetic layer having a large domain-wall coercive force, the domain wall in the first magnetic layer is fixed at a position corresponding to the position of the domain wall in the third magnetic layer.

In the present embodiment, as shown in FIG. 1A, when a domain wall 15 is present at the position $x_s$ of the medium, the temperature of the medium is raised to temperature $T_s$ which is close to the Curie temperature of the second magnetic layer (which is lower than the Curie temperatures of the first and third magnetic layers), so that the exchange coupling between the first magnetic layer and the third magnetic layer is disconnected. As a result, the domain wall 15 in the first magnetic layer "instantaneously" moves to a region having a higher temperature and a lower domain-wall-energy density, as indicated by the broken-line arrow shown in FIG. 1A.

When the domain wall 15 passes under the reproducing light-beam spot 16, all atomic spins in the first magnetic layer within the spot are aligned in one direction. Every time a domain wall 15 reaches the position $x_s$ in accordance with the movement of the medium, the domain wall 15 instantaneously moves under the spot, and all atomic spins within the spot are inverted and aligned in one direction. As a result, as shown in FIG. 1A, the amplitude of the reproduced signal is always constant and has a maximum value irrespective of the recorded interval between adjacent domain walls (i.e., the recording mark length), and is completely free from problems of waveform interference and the like caused by the optical diffraction limit.

Since the moving speed of the domain wall is not infinite, the time $\tau$ required for the domain wall to pass under the spot must not be longer than the time $t_{min}$ required for the medium to move the distance corresponding to the shortest recording mark length (see FIG. 2).

Figures 3A, 3B:
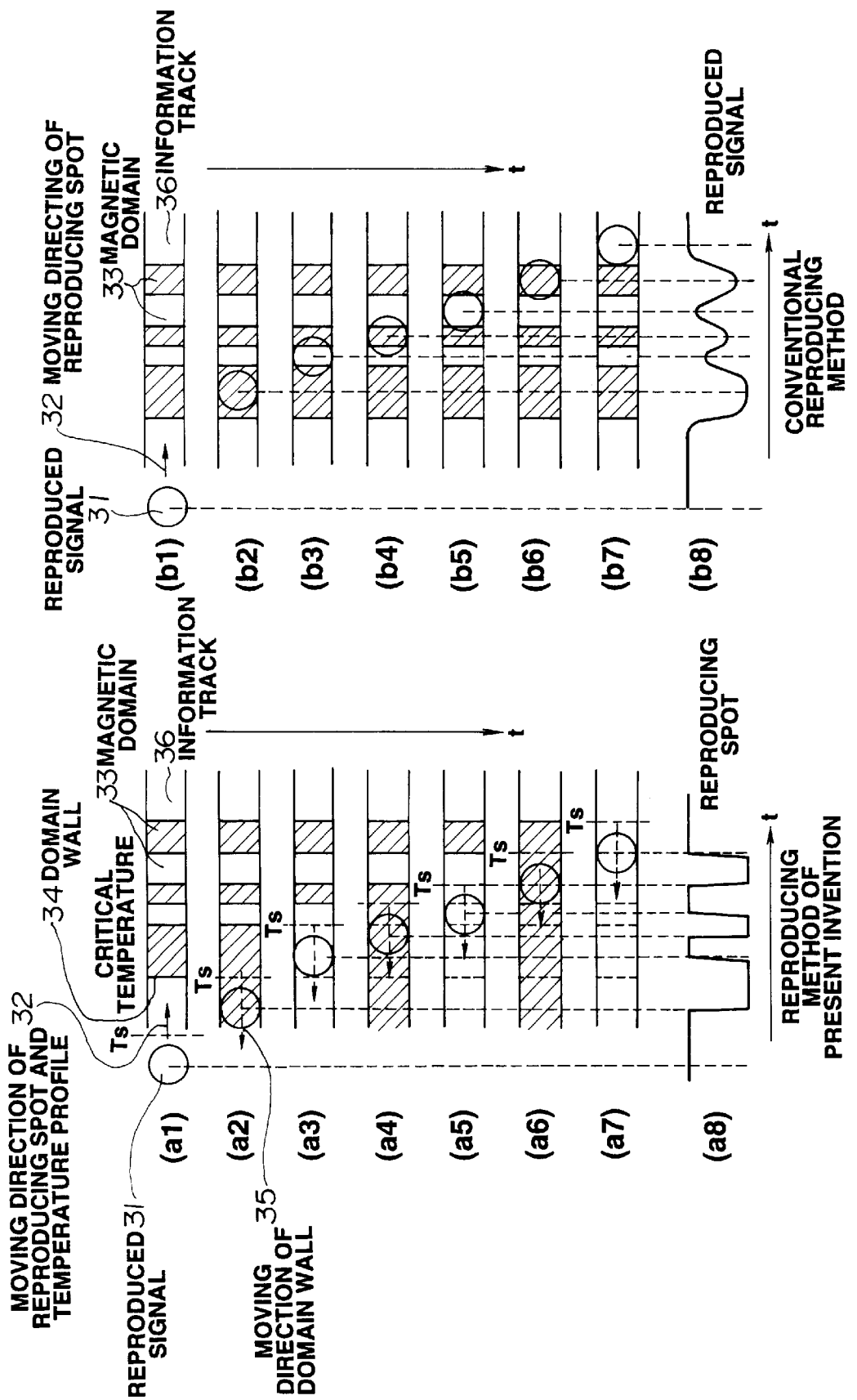
FIG. 3A a diagram schematically illustrating the information reproducing method of the first embodiment.
FIG. 3B is a diagram schematically illustrating a conventional reproducing method.

FIGS. 3A and 3B are schematic diagrams for comparing the information reproducing method of the present invention with a conventional information reproducing method. In FIGS. 3A and 3B, each combination of (a1) through (a7), and (b1) through (b7) indicates a state in which a reproducing spot 31 moves on an information track 36, on which magnetic domains having different recording mark lengths are formed. Each of (a8) and (b8) is a graph illustrating the obtained reproduced signal.

In the conventional reproducing method, the maximum amplitude of the reproduced signal cannot be obtained (b8) unless the reproducing spot 31 itself completely enters one magnetic domain on the information track 36 (b2). On the other hand, in the present embodiment, the reproducing spot 31 and the temperature profile are subjected to relative movement in the same direction 32, so that the temperature of a portion immediately preceding the reproducing spot 31 equals the critical temperature $T_s$ of the second magnetic layer. Accordingly, the temperature of the portion of a domain wall 34 equals the critical temperature $T_s$ immediately before the reproducing spot 31 reaches the domain wall 34, so that the domain wall 34 moves in the inverse direction 35, and the reproducing spot 31 completely enters the recorded mark (a2). Hence, the maximum amplitude of the reproduced signal can be instantaneously obtained (a8).

In the conventional reproducing method, when a magnetic domain 33 is smaller than the spot size, the reproducing spot 31 is not entirely accommodated within the magnetic domain 33 (b3–b7), and the obtained reproduced signal is not clear (b8). On the other hand, in the present embodiment, the magnetic domain sequentially moves backward in the reverse direction when the reproducing spot 31 substantially reaches the domain wall of the recorded mark (a3–a7), a very clear reproduced signal is obtained (a8).

Second Embodiment

A description has been provided of the magnetooptical recording medium having the first through third magnetic layers according to the first embodiment. In a second embodiment of the present invention, as shown in FIG. 4A, a fourth magnetic layer 44 may be provided between a first magnetic layer 41 and a second magnetic layer 42. The Curie temperature of the fourth magnetic layer 44 is higher than that of the second magnetic layer 42, and lower than that of the first magnetic layer 41. The fourth magnetic layer 44 comprises a vertically-magnetizing film which has a domain-wall coercive force smaller than that of a third magnetic layer 43 at at least temperatures equal to or higher than the Curie temperature of the second magnetic layer 42. The fourth magnetic layer 44 provides a force sufficient to move a domain wall within the first magnetic layer 41.

As shown in FIGS. 4A and 4B, also in the magnetooptical recording medium having the fourth magnetic layer 44, by raising the temperature of the medium to temperature $T_s$, which is close to the Curie temperature of the second magnetic layer 42, at position $x_s$, exchange coupling between the fourth magnetic layer 44 and the third magnetic layer 43 is disconnected, so that domain walls in the first magnetic layer 41 and the fourth magnetic layer 44 can move.

FIG. 4C is a graph indicating the distribution of the domain-wall-energy density $\sigma_1$ of the first magnetic layer 41 and the domain-wall-energy density $\sigma_4$ of the fourth magnetic layer 44, which corresponds to the above-described temperature distribution. As described above, when the domain-wall-energy density $\sigma_1$ has a gradient in the x direction as shown in FIG. 4C, a force $F_i$ is applied to a domain wall in each layer present at position x. The force $F_i$ moves the domain wall toward a side where the domain-wall energy is low.

In order to read recorded information at a high speed, each domain wall must be moved at a high speed. For that purpose, a large force must be applied to the domain wall. In general, the temperature dependency of the domain-wall-energy density increases as the temperature approaches the Curie temperature. Accordingly, the gradient of the domain-wall-energy density in the x direction can be increased by providing a temperature gradient within a temperature range near the Curie temperature, and a large force can be applied to a domain wall. In order to detect a change in the plane of polarization of reflected light from the first magnetic layer 41, the temperature of the medium must be much lower than the Curie temperature of the first magnetic layer 41 at a region irradiated by the reproducing light-beam spot.

As shown in FIG. 4A, if the fourth magnetic layer 44 having a Curie temperature lower than that of the first magnetic layer 41 is provided adjacent to the first magnetic layer 41 at a side opposite to the side where the light beam is projected, it is possible to provide in the region irradiated by the reproducing light-beam spot a temperature gradient in a temperature range much lower than the Curie temperature of the first magnetic layer 41, and near the Curie temperature of the fourth magnetic layer 44. As a result, a large force is applied to a domain wall in the fourth magnetic layer 44, and a large force obtained by adding a force caused by the exchange interaction with the fourth magnetic layer 44 is applied to a domain wall in the first magnetic layer 41.

Furthermore, if a gradient of the Curie temperature is provided in the direction of the thickness in the fourth magnetic layer 44 such that the Curie temperature decreases toward the second magnetic layer 42, the fourth magnetic layer 44 can be configured so as to have a temperature immediately below the Curie temperature in the x direction. Hence, a relatively large force can be applied over an entire range in the x direction where domain walls must be moved.

A description will now be provided of experimental examples, to which the above-described embodiments are applied, with reference to the drawings.

Figure 5:
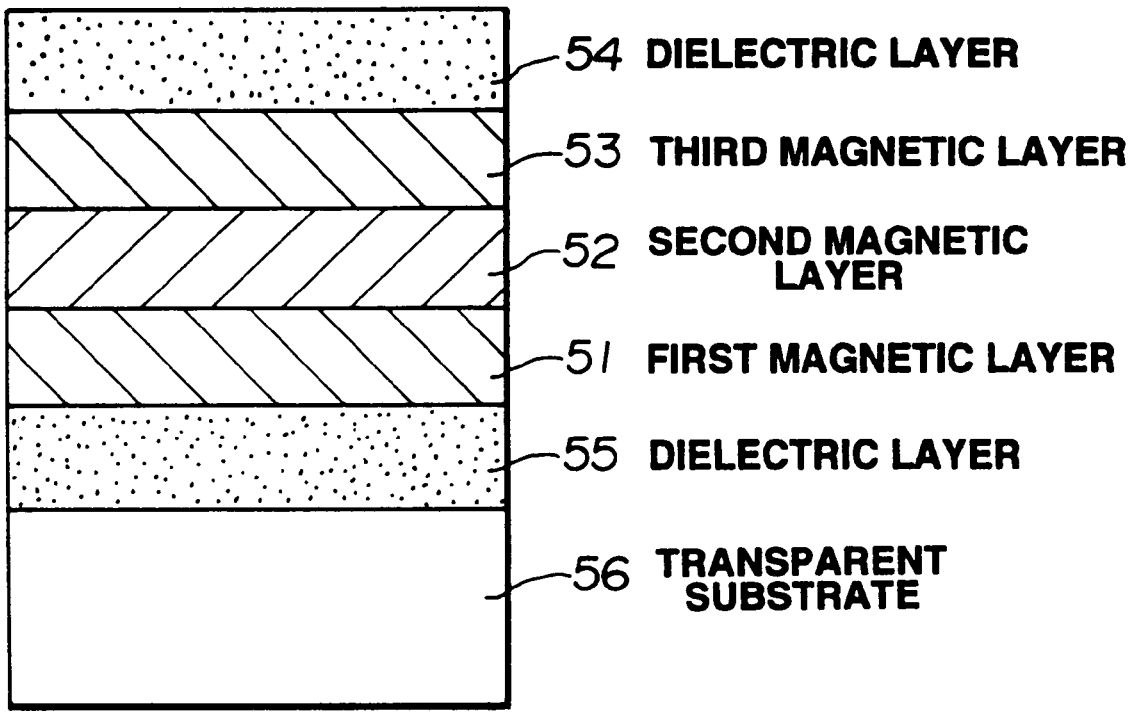
FIG. 5 is a cross-sectional view illustrating the schematic configuration of layers of a magnetooptical recording medium according to the first embodiment.

FIG. 5 is a cross-sectional view illustrating the schematic configuration of layers of a magnetooptical recording medium according to the first embodiment. In this configuration, a dielectric layer 55, a first magnetic layer 51, a second magnetic layer 52, a third magnetic layer 53 and a dielectric layer 54 are sequentially laminated on a transparent substrate 56.

For example, polycarbonate, glass or the like can be used for the transparent substrate 56. A transparent dielectric material, such as $Si_3N_4$, AlN, $SiO_2$, SiO, ZnS, $MgF_2$ or the like, can be used for the dielectric layer 55. The same kind of material can be used for the dielectric layer 54, which is finally formed as a protective layer. These layers can be deposited, for example, by continuous sputtering using a magnetron sputtering apparatus, continuous vacuum deposition or the like. By continuously forming the respective magnetic layers without breaking vacuum, the respective magnetic layers are in a state of exchange coupling with each other.

Thermal properties may be adjusted by adding a metallic layer, made of Al, AlTa, AlTi, AlCr, Cu or the like, to this configuration. A protective coating made of a polymer resin may also be added to the configuration. Formed layers may be bonded together.

In the above-described medium, the magnetic layers 51–53 may be made of various kinds of magnetic materials. For example, the magnetic layers 51–53 may be configured by rare-earth/iron-group amorphous alloys comprising 10–40 atomic % of one kind or at least two kinds of rare-earth metallic elements, such as Pr, Nd, Sm, Gd, Tb, Dy, Ho and the like, and 90–60 atomic % of one kind or at least two kinds of iron-group elements, such as Fe, Co, Ni and the like. In order to improve corrosion resistance, a small amount of elements selected from Cr, Mn, Cu, Ti, Al, Si, Pt, In and the like may be added.

In the case of using a rare-earth/iron-group amorphous alloy, the saturation magnetization of the alloy may be controlled by changing the compositional ratio of rare-earth elements to iron-group elements. The Curie temperature of the alloy may also be controlled by changing the compositional ratio. However, in order to control the Curie temperature independently of the saturation magnetization, it is preferable to use a material, in which part of Fe is replaced by Co, as iron-group elements, and to control the amount of replacement. That is, since the Curie temperature is estimated to rise about 6° C. by replacing 1 atomic % of Fe by Co, the amount of Co to be added is adjusted using this relationship so that a desired Curie temperature is obtained. It is also possible to lower the Curie temperature by adding a small amount of nonmagnetic elements selected from Cr, Ti and the like. The Curie temperature may also be controlled by adjusting the compositional ratio between at least two kinds of rare-earth elements.

In addition, materials, such as garnets, platinum-group/iron-group films having a periodic structure, platinum-group/iron-group alloys and the like, may be used.

For the first magnetic layer, a material for bubble memories, for example, a rare-earth/iron-group amorphous alloy having small vertical magnetic anisotropy, such as GdCo, GdFeCo, GdFe, NdGdFeCo or the like, or a garnet, is preferred.

For the third magnetic layer, a material having large vertical magnetic anisotropy which can stably hold a magnetized state, for example, a rare-earth/iron-group amorphous alloy, such as TbFeCo, DyFeCo, TbDyFeCo or the like, or a platinum-group/iron-group film having a periodic structure, made of Pt/Co, Pd/Co or the like, is preferred.

Recording of a data signal on the magnetooptical recording medium of the present embodiment is performed by modulating an external magnetic field while projecting a laser beam having a power to raise the temperature of the third magnetic layer to at least the Curie temperature onto the moving medium, or by modulating the power of a laser beam while applying a magnetic field in a certain direction. In the latter approach, by adjusting the intensity of the laser beam so that only a predetermined region within the laser-beam spot has a temperature near the Curie temperature of the third magnetic layer, a recorded magnetic domain having a size equal to or smaller than the diameter of the laser-beam spot can be formed. As a result, a signal having a period equal to or less than the diffraction limit of light can be recorded.

Figure 6:
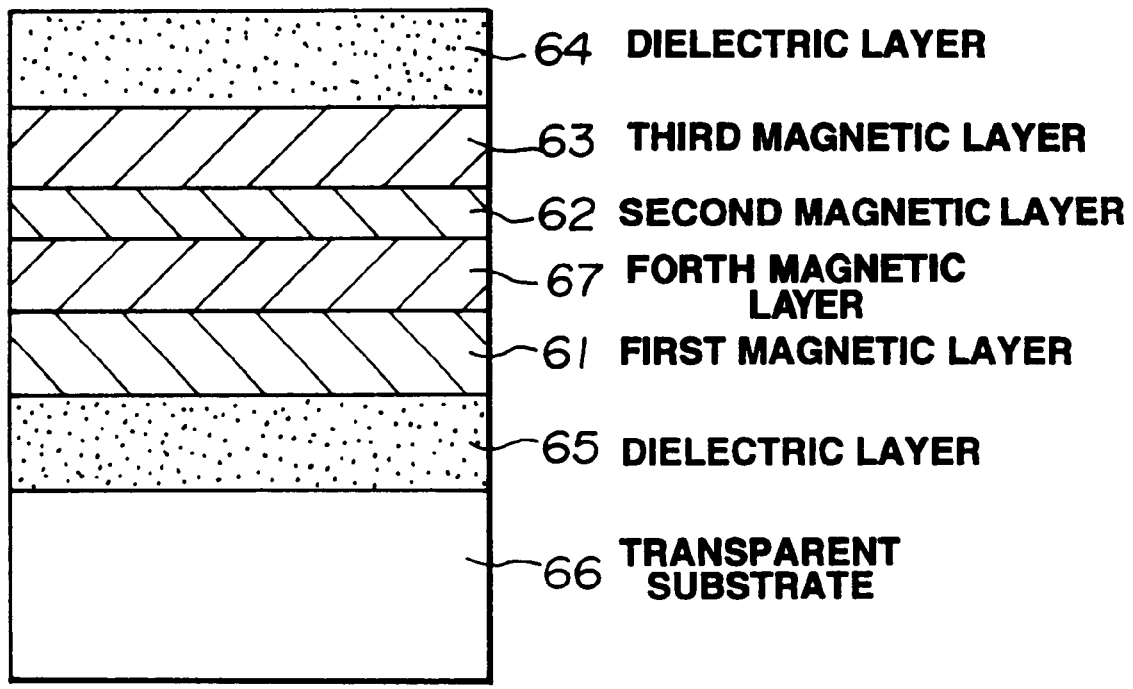
FIG. 6 is a cross-sectional view illustrating the schematic configuration of layers of a magnetooptical recording medium according to the second embodiment.

FIG. 6 illustrates the configuration of a medium in which a fourth magnetic layer is added to the above-described configuration. In this configuration, a dielectric layer 65, a first magnetic layer 61, a fourth magnetic layer 67, a second magnetic layer 62, a third magnetic layer 63 and a dielectric layer 64 are sequentially laminated on a transparent substrate 66. Materials and production methods of the respective layers are the same as those described with reference to FIG. 5.

The present invention will now be described in detail illustrating specific experimental examples. However, the invention is not limited to the following experimental examples unless the gist of the invention is exceeded.

First, experimental examples for the magnetooptical recording medium having first through third magnetic layer as shown in FIG. 5 will be described.

EXPERIMENTAL EXAMPLE 1

Targets made of B-doped Si, Gd, Dy, Tb, Fe and Co were mounted in a DC magnetron sputtering apparatus, a polycarbonate substrate, on which guide grooves for tracking are formed, was fixed on a substrate holder, and the chamber of the apparatus was evacuated by a cryopump until the pressure within the chamber became equal to or less than $1\times10^{-5}$ Pa. An Ar gas was introduced within the chamber until the pressure of the chamber became 0.3 Pa while evacuating the chamber. An SiN layer, serving as an interference layer, 800 angstrom thick was deposited while rotating the substrate. Thereafter, a GdCo layer, serving as a first magnetic layer, 300 angstrom thick, a DyFe layer, serving as a second magnetic layer, 100 angstrom thick, and a TbFeCo layer, serving as a third magnetic layer, 400 angstrom thick were sequentially deposited. Finally, an SiN layer, serving as a protective layer, 800 angstrom thick was deposited. When depositing the SiN layer, an $N_2$ gas was introduced in addition to the Ar gas, and the layer was deposited by DC reactive sputtering. The respective magnetic layers were deposited by applying DC power to the respective targets made of Gd, Dy, Tb, Fe and Co.

The composition of each magnetic layer was adjusted so as to be close to the compensated composition. The Curie temperatures of the first magnetic layer, the second magnetic layer and the third magnetic layer were set to be about at least 300° C., 70° C. and 200° C., respectively.

Figure 7A:
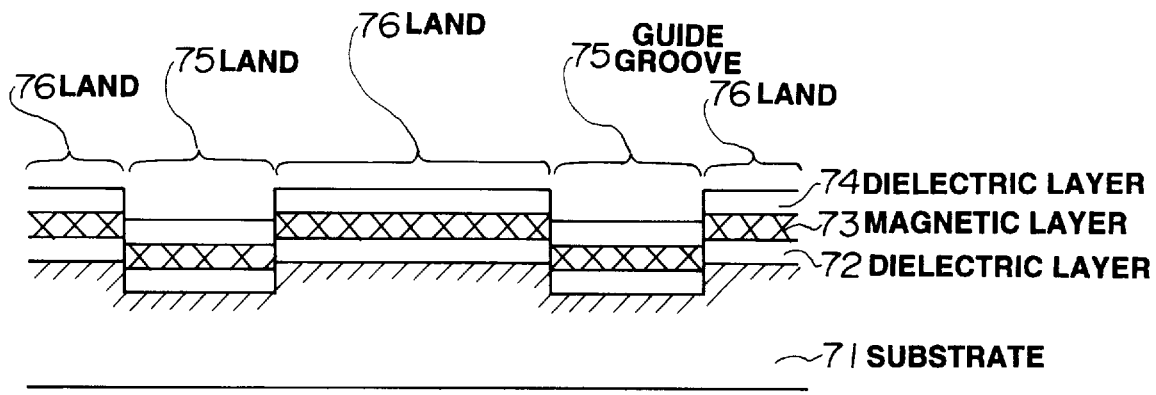
FIG. 7A is a cross-sectional view of a magnetooptical recording medium of a first experimental example.
Figure 7B:
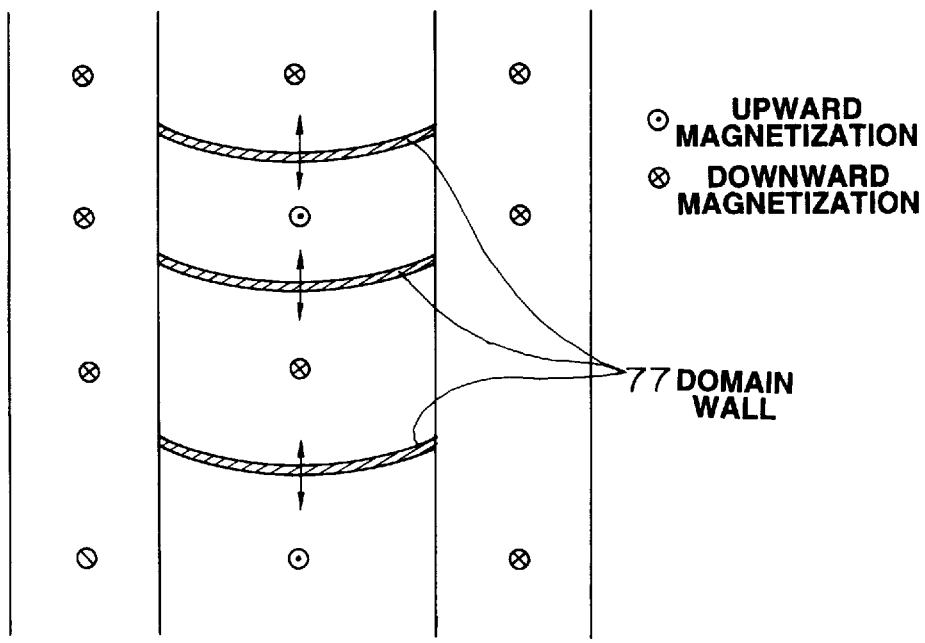
FIG. 7B is a diagram illustrating domain walls in the first experimental example.

As shown in the cross-sectional view of FIG. 7A, this medium comprises a dielectric layer 72, a magnetic layer 73 and a dielectric layer 74 laminated on a substrate 71, and concentric circular guide grooves or spiral guide grooves having a rectangular cross section 1000 angstrom deep are formed on the substrate 71. Accordingly, the magnetic layer 73 laminated on lands 76 is substantially separated at portions of guide grooves 75. Actually, the magnetic layer 73 becomes continuous, because a magnetic film is slightly deposited even on step portions. However, since the thickness of the film is much smaller than the thickness of the magnetic layer in other portions, the connection at the step portions can be neglected. In the present invention, a state in which respective information tracks are magnetically separated from each other includes such a state. When reverse magnetic domains are formed on the land 76 at its entire width, as shown in FIG. 7B, nonclosed domain walls 77 are formed at boundary portions of the magnetic domains on the land 76. Such domain walls 77 can be easily moved in the direction of the track, because there is no generation/extinction of domain walls 77 at the sides of the track. The effect of magnetically-separated information tracks can be sufficiently obtained even if only the first magnetic layer is magnetically separated instead of magnetically separating all the layers.

Recording/reproducing characteristics were measured for the magnetooptical recording medium obtained in the above-described manner.

Figure 8:
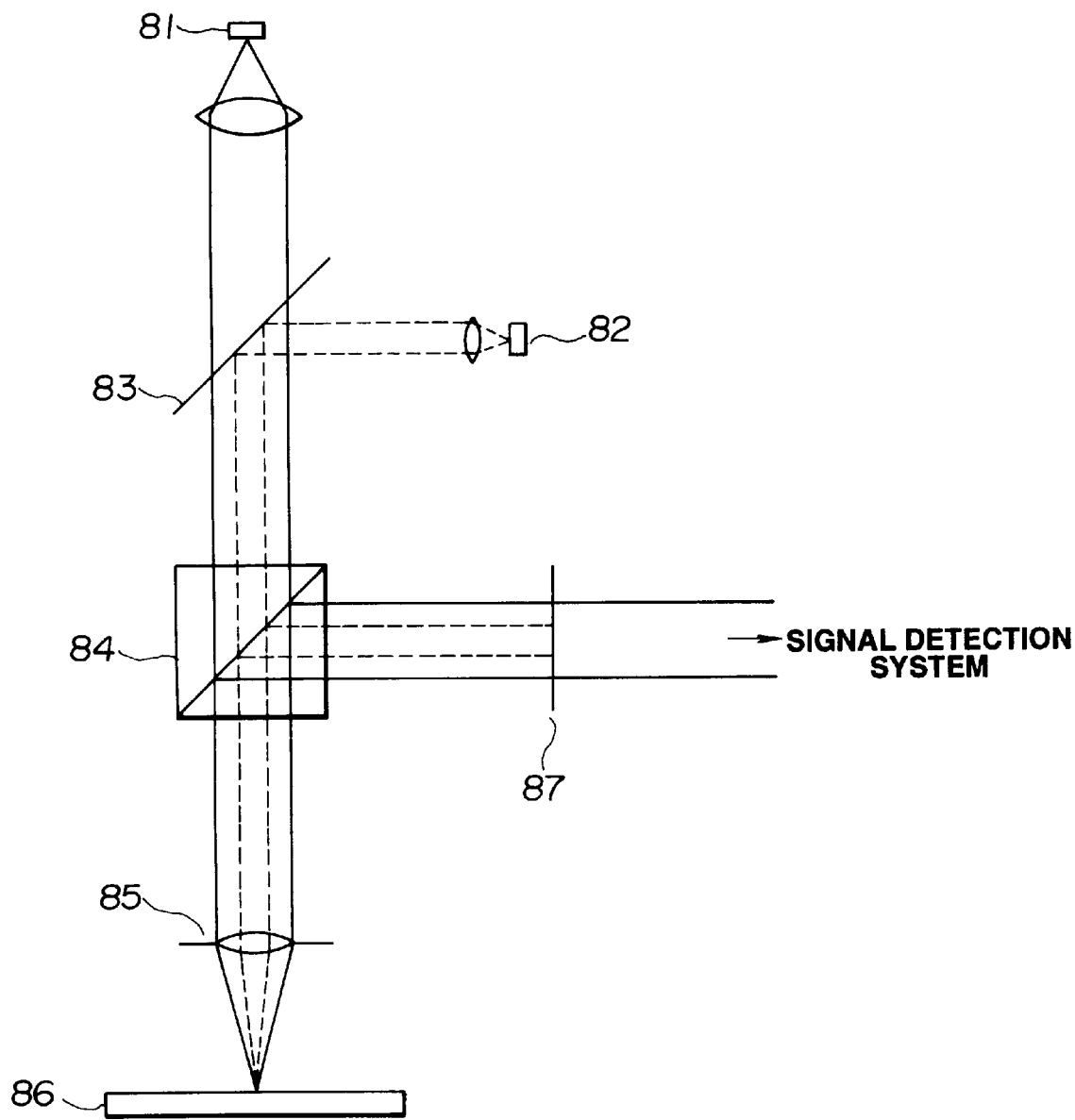
FIG. 8 is a diagram schematically illustrating a recording/reproducing apparatus used for measuring a sample of the first experimental example.

As shown in FIG. 8, the recording/reproducing apparatus used for the measurement includes the optical system of an ordinary magnetooptical-disk recording/reproducing apparatus, and a laser light source for heating added thereto. In FIG. 8, a laser light source 81 for recording/reproduction has a wavelength of 780 nm, and is disposed so that P-polarized light is incident upon the recording medium. A laser light source 82 for heating has a wavelength of 1.3 $\mu$m, and is disposed so that P-polarized light is incident upon the recording medium. A dichroic mirror 83 is designed so that light having a wavelength of 780 nm is transmitted by 100%, and light having a wavelength of 1.3 $\mu$m is reflected by 100%. A polarizing beam splitter 84 is designed so that P-polarized light beams having wavelengths of 780 nm and 1.3 $\mu$m are transmitted by 70–80%, and S-polarized light beams having the same wavelengths are reflected by 100%. The diameter of the light beam having the wavelength of 1.3 $\mu$m is arranged to be smaller than the aperture of an objective lens 85, and to have an NA (numerical aperture) smaller than that of the light beam having the wavelength of 780 nm condensed after passing through the entire aperture. A dichroic mirror 87 is provided in order to prevent entrance of the light having the wavelength of 1.3 $\mu$m into a signal detection system, and is designed so as to transmit the light having the wavelength of 780 nm by 100%, and to reflect the light having the wavelength of 1.3 $\mu$m by 100%.

As shown in FIG. 9A, this optical system can image a recording/reproducing spot 91 and a heating spot 92 on a land 95 between adjacent guide grooves 94 on the recording surface of a recording medium 86. Since the heating spot 92 has a long wavelength and a small NA, its diameter is greater than that of the recording/reproducing spot 91. Hence, it is possible to easily provide a desired temperature gradient as shown in FIG. 9B in the region of the recording/reproducing spot 91 on the recording surface of the moving medium. In FIG. 9A, isotherm 96 of temperature $T_s$ is also shown.

Recording/reproduction was performed by rotatably driving the medium at a linear velocity of 5 m/sec.

First, by modulating the magnetic field in the range of ±150 Oe while performing DC irradiation of the recording/reproducing laser beam at 8 mW, a repeated pattern comprising upward magnetization and downward magnetization corresponding to the modulation of the magnetic field was formed in a cooling process after heating the medium at at least the Curie temperature of the third magnetic layer. At that time, the recording power of the recording/reproducing laser beam can be reduced by simultaneously projecting the heating laser beam.

The modulation frequency of the recording magnetic field was changed between 1–10 MHz (megahertz) to record patterns having mark lengths in the range of 2.5–0.25 $\mu$m.

The power of the recording/reproducing laser beam at a reproducing operation was arranged to be 1 mW. The C/N ratio was measured for the pattern of each mark length by detecting a change in the plane of polarization of reflected light of the recording/reproducing laser beam while simultaneously projecting the heating laser beam having a power of 20 mW. The temperature distribution on the surface of the medium at that time is shown in FIG. 9B. This temperature distribution has a gradient in the moving direction of the recording/reproducing spot 91.

Figure 10:
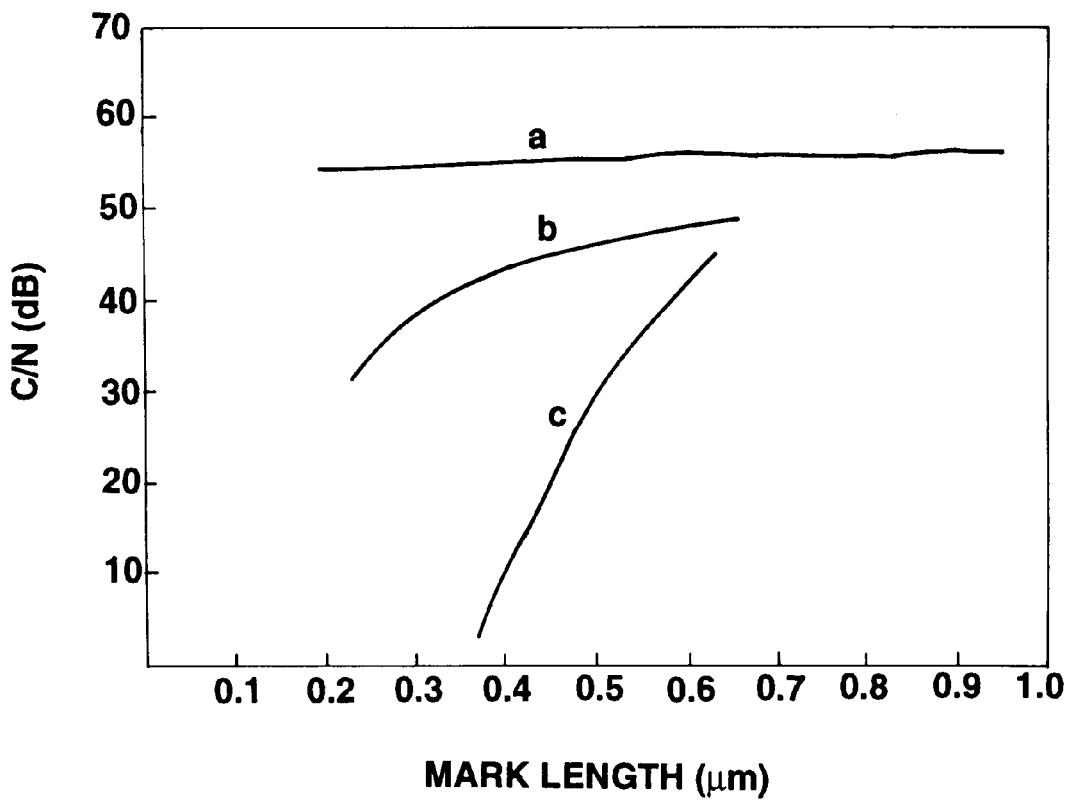
FIG. 10 is a graph illustrating the C/N ratio obtained from the sample of the first experiential example.

A graph line "a" shown in FIG. 10 represents the result of the measurement. For the purpose of comparison, a result of measurement by the conventional ultrahigh-resolution reproducing method described in Japanese Patent Laid-open Application (Kokai) No. 3-93058 (1991) is shown by a graph line b, and a result of measurement by an ordinary reproducing method, in which an ultrahigh resolution phenomenon does not occur, is shown by a graph line c.

According to the reproducing method of the present invention, since the entirety of reversal of magnetization within the reproducing spot can be detected even if the mark length is short, a signal having a period equal to or less than the diffraction limit of light can be reproduced, and the mark-length dependency of the C/N ratio substantially disappears.

In the medium of the present experimental example, a manner in which the domain walls of the first magnetic layer move caused by the temperature gradient was confirmed by direct observation using a polarizing microscope, as will be described below.

First, a sample having the same configuration as in the first experimental example, in which the order of lamination of the magnetic layers is inverted, was prepared. A magnetic-domain pattern was formed in the sample by the same recording method as in the case of first experimental example. The pattern was observed from the film side, i.e., the side of the first magnetic layer, using the polarizing microscope.

Next, the heating condensed laser beam was projected onto the sample to form substantially the same temperature distribution as in the first experimental sample within the field of view of the polarizing microscope.

In this state, a magnetic field of about 500 Oe was applied to the sample. As a result, only the circular region corresponding to the temperature distribution (the region of the first magnetic layer adjacent to the region of the second magnetic layer whose temperature is raised to at least the Curie temperature of the second magnetic layer) was observed to be oriented in the direction of the external magnetic field. This indicates that the exchange coupling between the first magnetic layer and the third magnetic layer is disconnected in this region.

Next, the application of the magnetic field was stopped, and the sample was slowly moved in the direction of the track. At that time, a moved magnetic domain was observed to expand toward the center of the circular region, every time the boundary portion between adjacent magnetic domains formed on the track entered the above-described circular region where the exchange coupling was disconnected.

When the irradiation of the heating laser beam was interrupted, the magnetic-domain pattern preserved in the third magnetic layer was observed to be transferred to the first magnetic layer.

As described above, in the region where the exchange coupling with the third magnetic layer was disconnected, the domain wall in the first magnetic layer was confirmed to move toward a higher-temperature side caused by the temperature gradient.

EXPERIMENTAL EXAMPLE 2

Each magnetooptical recording medium was prepared by forming thin films on a polycarbonate substrate using the same apparatus and method for forming films as in the case of the first experimental example. However, the forming method and the structure of the obtained medium were changed in the following three items.

First, an accelerated irradiation processing using Ar ions was performed for the surface of the substrate before forming the films. Second, an accelerated irradiation processing using Ar ions was performed for the surface of the film after forming the SiN layer, serving as the interference layer. The surface of the obtained medium was smoothed by the above-described processing. Thirdly, the thickness of the first magnetic layer was changed to 2000 angstroms. These changed items independently contribute to improvement in the mobility of domain walls of the first magnetic layer.

Recording/reproducing characteristics of the above-described medium was measured by the same method as in the case of the first experimental example, and excellent results as in the first experimental example were obtained. The reproducing characteristics of the medium were not deteriorated even if the medium was reproduced by increasing the linear velocity of the medium during a reproducing operation up to 20 m/sec.

EXPERIMENTAL EXAMPLE 3

Each magnetooptical recording medium was prepared by forming thin films on a polycarbonate substrate using the same apparatus and method for forming films as in the case of the first experimental example.

In the present experimental example, however, prepits are formed on the substrate, and the cross section of the guide grooves has a U-like shape. Accordingly, the laminated magnetic layer is not separated at the guide groove portions.

A high-power laser beam was projected onto the guide groove portions to anneal the entire magnetic layer at the guide groove portions. As a result, the property of the magnetic layer at the guide groove portions changed to become a in-plane-magnetizing film, and the coupling between the magnetic layers on adjacent tracks was disconnected. Recording/reproducing characteristics of this medium were measured in the same manner as in the case of the first experimental example, and excellent results as in the case of the first experimental example were obtained.

Recording/reproducing characteristics of the medium, to which the above-described annealing processing was not performed, were measured in the same manner as in the case of the first experimental example. Although noise increased compared with the result of the first experimental example, a signal having a period equal to or less than the diffraction limit of light could be sufficiently reproduced. In this medium, magnetic domains surrounded by closed domain walls are present. Hence, when a domain wall was moved so as to expand the magnetic domain, the operation of the medium became unstable, and noise increased.

In order to disconnect the coupling between magnetic layers on adjacent tracks, patterning may be performed using etching.

EXPERIMENTAL EXAMPLE 4

Recording/reproducing characteristics of the medium of the first experimental example were evaluated using substantially the same recording/reproducing apparatus as that used for the first experimental example.

Figure 11A:
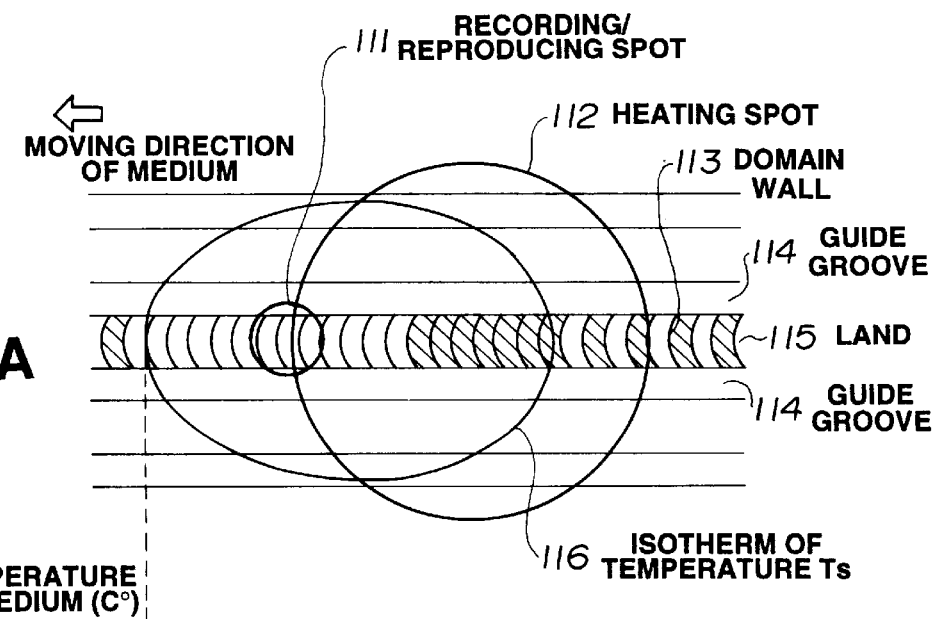
FIGS. 11A and 11B are diagrams schematically illustrating a reproducing state for a sample of a fourth experimental example.
Figure 11B:
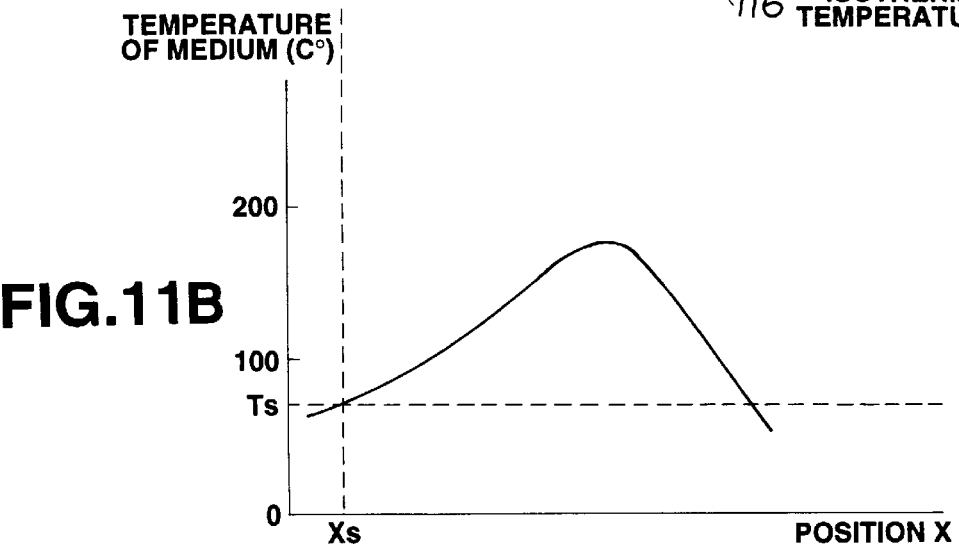

In this experimental example, however, the positional relationship between the recording/reproducing spot and the heating spot was changed as shown in FIG. 11A. That is, the recording/reproducing spot was arranged to be projected onto a portion corresponding to the slope in a front portion in the moving direction of the medium in the temperature distribution provided by the heating laser spot.

When the medium has moved and passed through the position S shown in FIG. 11A, the first magnetic layer and the third magnetic layer are coupled again, so that the oriented magnetized state of the third magnetic layer is transferred onto the first magnetic layer. When a domain wall in the third magnetic layer has passed through the position S, a domain wall is left at the position S in the first magnetic layer, and the domain wall instantaneously moves backward. If the recording/reproducing spot is projected in the above-described manner, the movement of the domain wall at that time is detected.

In this arrangement, since the shape of the isotherm of critical temperature $T_s$ indicated by S substantially coincides with the shape of the domain wall of the magnetic domain formed by the magnetic-field modulation method, the movement of the domain wall is more stably performed.

EXPERIMENTAL EXAMPLE 5

Recording/reproducing characteristics of the medium of the experimental example 1 were measured by an ordinary magnetooptical-disk recording/reproducing apparatus, in which a heating laser beam is not provided.

The recording/reproducing characteristics were obtained in the same manner as in the case of the first experimental example, except that the heating laser beam was not projected. An excellent C/N ratio was obtained by increasing the power of the reproducing laser beam to about 3 mW. However, compared with the results of the first experimental example, the C/N ratio was lower by about 5 dB at each mark length. The reason is as follows. That is, since the temperature of the medium does not increase at a leading portion of the reproducing spot, a domain wall starts to move in the midpoint of the reproducing spot. Hence, the entire spot region cannot be used as efficient as in the case of the first experimental example.

Next, experimental examples of the magnetooptical recording medium having first through fourth magnetic layers as shown in FIG. 6 will be described.

EXPERIMENTAL EXAMPLE 6

Targets made of B-doped Si, Tb, Fe, Co and Cr were mounted in a DC magnetron sputtering apparatus, a polycarbonate substrate, on which guide grooves for tracking are formed, was fixed on a substrate holder, and the chamber of the apparatus was evacuated by a cryopump until the pressure within the chamber became equal to or less than $1 \times 10^{-5}$ Pa.

An Ar gas was introduced within the chamber until the pressure of the chamber became 0.3 Pa while evacuating the chamber. An SiN layer, serving as an interference layer, 800 angstrom thick was deposited while rotating the substrate. Thereafter, a GdCoCr layer, serving as a first magnetic layer, 300 angstrom thick, a GdFeCr layer, serving as a fourth magnetic layer, 300 angstrom thick, a TbFeCr layer, serving as a second magnetic layer, 100 angstrom thick, and a TbFeCo layer, serving as a third magnetic layer, 400 angstrom thick were sequentially deposited. Finally, an SiN layer, serving as a protective layer, 800 angstrom thick was deposited. When depositing the SiN layer, an $N_2$ gas was introduced in addition to the Ar gas, and the layer was deposited by DC reactive sputtering. The respective magnetic layers were deposited by applying DC power to the respective targets made of Gd, Tb, Fe, Co and Cr.

The composition of each magnetic layer was adjusted so as to be close to the compensated composition. The Curie temperatures of the first magnetic layer, the fourth magnetic layer, the second magnetic layer and the third magnetic layer were set to be about at least 300° C., 170° C., 70° C. and 200° C., respectively. This medium has a cross section as shown in FIG. 7A as the first experimental example.

Recording/reproducing characteristics of the obtained magnetooptical recording medium were measured in the same manner as in the case of the first experimental example. However, in contrast to the case of the first experimental example, the power of the DC-irradiation laser beam during a recording operation was 10 mW, and the power of the heating laser beam during a reproducing operation was 25 mW. As in the case of the first experimental example, an excellent result of experiment as indicated by graph line "a" shown in FIG. 10 was obtained.

The reproducing characteristics were not deteriorated even when the linear velocity of the medium during a reproducing operation was increased up to 20 m/sec.

As in the case of the first experimental example, a manner in which a domain wall in the first magnetic layer moves caused by the temperature gradient was confirmed by direct observation under a polarising microscope.

EXPERIMENTAL EXAMPLE 7

Each magnetooptical recording medium was prepared by forming thin films on a polycarbonate substrate using the same apparatus and method for forming films as in the case of the fifth experimental example.

In the present experimental example, however, the fourth magnetic layer was configured by first, second and third compositional layers in the order from the side of the first magnetic layer. The Curie temperatures of the respective compositional layers are 180° C., 160° C. and 140° C., respectively, and the thicknesses of the respective compositional layers are 200 angstroms, 400 angstroms and 800 angstroms, respectively, so that a stepwise gradient is provided in the Curie temperature in the direction of the thickness within the fourth magnetic layer. GdFeCoCr was used as the material for the compositional layers.

The first magnetic layer comprises a GdFeCoCr layer having a Curie temperature of 300° C. and a thickness of 200 angtroms, the second magnetic layer comprises a TbFeCoCr layer having a Curie temperature of 120° C. and a thickness of 200 angstroms, and the third magnetic layer comprises a TbFeCoCr layer having a Curie temperature of 200° C. and a thickness of 600 angstroms.

The compositional ratio of the rare-earth elements to the iron-group elements was adjusted so that the composition of each magnetic layer is close to the compensated composition, and the Curie temperature of each magnetic layer was set to the above-described value by adjusting the amount of addition of Co and Cr.

Recording/reproducing characteristics of the above-described medium was measured by the same method as in the case of the fifth experimental example, and excellent results as in the case of the fifth experimental example were obtained. The reproducing characteristics of the medium were not deteriorated even when the medium was reproduced by increasing the linear velocity of the medium during a reproducing operation up to 30 m/sec.

In the present experimental example, during a reproducing operation, a temperature gradient from about 120° C. to 180° C. in the direction of the track was formed in the region of the recording/reproducing spot on the recording surface of the medium. In this case, a large force is applied to a domain wall in the third compositional layer of the fourth magnetic layer in the region from 120° C. to 140° C., a large force is applied to a domain wall in the second compositional layer of the fourth magnetic layer in the region from 140° C. to 160° C., and a large force is applied to a domain wall in the first compositional layer of the fourth magnetic layer in the region from 160° C. to 180° C. Hence, it is possible to move domain walls present in the first magnetic layer through the fourth magnetic layer with relatively large forces, and to perform the reproducing operation of the present invention more stably at a high speed.

EXPERIMENTAL EXAMPLE 8

Each magnetooptical recording medium was prepared by forming thin films on a polycarbonate substrate using the same apparatus and method for forming films as in the case of the fifth experimental example.

In the present experimental example, however, prepits are formed on the substrate, and the cross section of the guide grooves has a U-like shape. Accordingly, the laminated magnetic layer is not separated at the guide groove portions.

The configuration of the magnetic layers and the like was the same as that in the case of the fifth experimental example, except that the composional ratio of the fourth magnetic layer was changed in the following manner.

As the fourth magnetic layer, sample (1), having a composition such that iron-group-element sublattice magnetization is dominant at the room temperature by adjusting the compositional ratio of Gd in GdFeCr, sample (2), having a composition such that rare-earth-element sublattice magnetization is dominant at the room temperature, and the compensation temperature is present at a temperature equal to or less than the Curie temperature, and sample (3), having a composition such that rare-earth-element sublattice magnetization is dominant at the room temperature and the compensation temperature is not present at a temperature equal to or less than the Curie temperature, were prepared. The Curie temperature of each sample was set to 170° C. by adjusting the amount of addition of Cr.

A high-power laser beam was projected onto the guide groove portions of these samples to anneal the entire magnetic layer on the guide groove portions. As a result, the property of the magnetic layer at the guide groove portions changed, and the coupling between the magnetic layers on adjacent tracks was disconnected.

Recording/reproducing characteristics of these samples were measured in the same manner as in the case of the fifth experimental example, and excellent results as in the case of the fifth experimental example were obtained at a linear velocity of 5 m/sec.

However, when the samples were reproduced while increasing the linear velocity up to 30 m/sec, the C/N ratio decreased by about 5 dB in sample (1). On the other hand, the C/N ratio decreased very little in sample (2), and the C/N ratio decreased only by about 2 dB in sample (3).

The reason is considered as follows. That is, the temperature dependency of the domain-wall energy near the Curie temperature is greater for a composition such that rare-earth-element sublattice magnetization is dominant at the room temperature, and particularly, for a composition having the compensation temperature at a temperature equal to or less than the Curie temperature, and a greater force can be applied to a domain wall caused by the temperature gradient.

The first magnetic layer in the first embodiment may be configured by a magnetic film which is an in-plane-magnetizing film at the room temperature, and becomes a vertically-magnetizing film when the temperature is raised.

An example of such a configuration will be shown in the following table.

|  | Material | Film thickness | $T_{comp}$ | $T_c$ |
|---|---|---|---|---|
| First magnetic layer | GdFeCo | 50 nm | 120° C. | >300° C. |
| Second magnetic layer | TbFe | 5 nm | RT | 120° C. |
| Third magnetic layer | TbFeCo | 40 nm | RT | 250° C. |

The composition of the first magnetic layer is arranged to greatly shift to the rare-earth side from the compensated composition, and the saturation magnetization of the layer at the room temperature is arranged to equal at least 200 emu/cc.

The composition of each of the second and third magnetic layers is near the compensated composition.

The configuration of other components is the same as in the first experimental example.

In the above-described configuration, since the first magnetic layer has large saturation magnetization at the room temperature, the magnetization of the layer is orientated within the plane of the film by the action of demagnetizing-field energy. If the temperature is raised to near the compensation temperature (120° C.), the saturation magnetization reaches zero and the demagnetizating-field energy decreases. Hence, the magnetization is vertically oriented.

By configuring the first magnetic layer by such a magnetic material having relatively large in-plane anisotropy, the domain walls smoothly move, and the operation of the medium is stabilized.

The present invention is not limited to the above-described experimental examples. As another possible example, a method may be considered in which the temperature distribution on the medium is adjusted by another means using the same optical head. For example, the core of a floating head used in magnetic-field modulation recording may be used as a heat source, or another appropriate heating member may be disposed near the region irradiated by the reproducing laser beam on the medium. In this case, however, a care must be taken so that the positional relationship between the position having the temperature to start the movement of a domain wall and the reproducing spot does not change at a frequency close to the frequency of the reproduced signal.

Third Embodiment

A third embodiment of the present invention will now be described in detail with reference to the drawings.

In the following embodiments of the present invention including the present embodiment, the names of respective magnetic layers are changed. A magnetic-domain magnifying layer, an intermediate layer and a recording layer in these embodiments correspond to the first magnetic layer, the second magnetic layer and the third magnetic layer in the above-described first and second embodiments, respectively.

In the following embodiments including the present embodiment, a sufficiently excellent C/N ratio can be obtained even without using a heating laser spot as in the first and second embodiments.

FIG. 12A is a cross-sectional view of an optical disk according to the present embodiment. As shown in FIG. 12A, in the optical disk of the present embodiment, an interference layer, a reproducing layer 1201, a magnetic-domain magnifying layer 1202, an intermediate layer 1203, a recording layer 1204 and a protective layer are sequentially laminated on a substrate in the described order. A transparent material, such as glass or polycarbonate, is generally used for the substrate. The respective layers can be deposited by continuous sputtering using a magnetron sputtering apparatus, continuous vacuum deposition or the like. The interference layer is provided in order to improve the magnetooptical effect, and is made of a transparent material, such as $Si_3N_4$, AlN, $SiO_2$, SiO, ZnS, $MgF_2$ or the like. The protective layer is used for protecting the magnetic layers, and is made of the same material as for the intereference layer. Since the interference layer and the protective layer are not related to the essence of the present invention, a detailed description thereof will be omitted. Arrows 1211 in the magnetic layer indicate the orientation of magnetization in the layer. A domain wall (a Bloch wall) 1212 is present at the boundary between magnetic domains in which the orientations of magnetization are inverse to each other.

A rare-earth/iron-group element amorphous alloy, such as TbFeCo, DyFeCo, TbDyFeCo or the like, having large vertical magnetic anisotropy and a large coercive force, in which very small recording pits can be formed and stably preserved, is used for the recording layer 1204. Recorded information is preserved in a state in which each magnetic domain in this layer is upwardly oriented or downwardly oriented. A vertically-magnetizing layer, made of a garnet, Pt/Co, Pd/Co or the like, may also be used, so that information can be magnetically transferred onto another layer. The coercive force of the recording layer 1204 at the room temperature is greater than the coercive forces of the reproducing layer 1201 and the magnetic-domain magnifying layer 1202 at the room temperature.

A rare-earth/iron-group element amorphous alloy is used for the intermediate layer 1203 as for other magnetic layers. This layer comprises a vertically-magnetizing layer whose Curie temperature $Tc_3$ is about 70° C., which is the lowest value compared with those of other magnetic layers. This layer is in a state of exchange coupling with the recording layer 1204 at temperatures equal to or less than $Tc_3$.

A material for bubble memories, for example, a rare-earth/iron-group element amorphous alloy, such as GdCo, GdFeCo, GdFe, NdGdFeCo or the like, having small vertical magnetic anisotropy, or a garnet is used for the magnetic-domain magnifying layer 1202, so as to provide a smaller domain-wall coercive force than those of other magnetic layers, and a large domain-wall mobility.

A rare-earth/iron-group element amorphous alloy, such as GdCo, GdFeCo, TbFeCo, DyFeCo, GdTbFeCo, GdDyFeCo, TbDyFeCo or the like, is preferred for the reproducing layer 1201. In order to increase the Kerr rotation angle at short wavelengths, light rare-earth elements selected from Nd, Pr, Sm and the like may be added to the above-described material. Alternatively, a platinum-group/iron-group film having a periodic structure, made of Pt/Co, PdCo or the like, may be used. The reproducing layer 1201 has a composition such that rare-earth-element sublattic magnetization is dominant at the room temperature. In a state of a single layer, this layer comprises an in-plane-magnetizing layer. However, if this layer is laminated with another vertically-magnetizing layer, the magnetic moment of this layer is oriented vertically to the surface of the layer caused by the exchange coupling force. The Curie temperature of the reproducing layer 1201 is higher than that of the magnetic-domain magnifying layer 1202.

It is preferable that the thicknesses of the interference layer, the reproducing layer 1201, the magnetic-domain magnifying layer 1202, the intermediate layer 1203, the recording layer 1204 and the protective layer are about 80 nm, 40 nm, 30 nm, 10 nm, 30 nm and 70 nm, respectively.

Thermal properties of the medium may be adjusted by adding a metallic layer, made of Al, AlTa, AlTi, AlCr, Cu or the like, to the above-described configuration. Furthermore, a protective coating made of a polymer resin may also be added. Alternatively, formed layers may be bonded together.

Recording of a data signal on the optical disk of the present embodiment is performed by modulating an external magnetic field while projecting a laser beam having a power to raise the temperature of the recording layer 1204 to about the Curie temperature ($Tc_4$) onto the moving medium, or by modulating the power of a laser beam while applying a magnetic field in a certain direction. In the latter approach, by adjusting the intensity of the laser beam so that only a predetermined region within the laser-beam spot has a temperature equal to $Tc_4$, a recorded magnetic domain having a size equal to or smaller than the diameter of the laser-beam spot can be formed. As a result, a signal having a period equal to or less than the diffraction limit of light can be recorded.

FIG. 12B shows the temperature distribution at the center of the track when the optical disk moves to the right while a laser light beam is projected onto the optical disk. At that time, since the disk moves at a linear velocity of about 8 m/s, the position where the temperature of the film has a maximum value is behind the center of the laser-beam spot in the moving direction of the laser-beam spot. FIG. 12C is a diagram illustrating the distribution of the domain-wall-energy density $\sigma_2$ in the magnetic-domain magnifying layer 1202 in a tangential direction. Usually, the domain-wall-energy density decreases as the temperature rises, and becomes zero at at least the Curie temperature. Accordingly, if there is a temperature gradient as shown in FIG. 12B in the tangential direction, the domain-wall-energy density $\sigma_2$ decreases toward the Curie temperature, as shown in FIG. 12C.

The following force $F_2$ is applied to a domain wall in each layer present at position x in the tangential direction:

$$F_2 = d\sigma_2/dx.$$

This force $F_2$ is applied so as to move the domain wall toward a portion having lower domain-wall energy. The magnetic-domain magnifying layer 1202 has a lower domain-wall coercive force and a larger domain-wall mobility than those of other magnetic layers. Hence, if the exchange coupling force from the intermediate layer is disconnected, the domain wall can be easily moved toward a portion having lower domain-wall energy by this force $F_2$.

In FIG. 12A, the four magnetic layers are in a state of exchange coupling with each other before the laser light beam is projected onto the disk, i.e., at the room temperature, and magnetic domains recorded in the recording layer 1204 are transferred to the reproducing layer 1201. At that time, a domain wall 1212 is present in each layer at the boundary of adjacent magnetic domains 1211 in which the directions of magnetization are inverse to each other. At a portion where the temperature of the disk equals at least the Curie temperature ($Tc_3$) of the intermediate layer 1203, the magnetization of the intermediate layer 1203 disappears, and the exchange coupling between the magnetic-domain magnifying layer 1202 and the recording layer 1204 is disconnected. As a result, the force to hold the domain wall disappears in the domain-wall magnifying layer 1202, so that the domain wall is moved toward the high-temperature side by the force $F_2$ applied to the domain wall. The moving speed of the domain wall is much greater than the moving speed of the disk. Hence, a magnetic domain whose size is greater than the magnetic domain preserved in the recording layer 1204 is transferred onto the magnetic-domain magnifying layer 1202. The reproducing layer 1201 has a magnetic moment perpendicular to the plane of the magnetic layers at temperature lower than the Curie temperature $Tc_2$ of the magnetic-domain magnifying layer 1202 caused by the exchange coupling with the magnetic-domain magnifying layer 1202, and magnetic domains in the magnetic-domain magnifying layer 1202 are transferred to the reproducing layer 1201 caused by the exchange coupling with the magnetic-domain magnifying layer 1202. At temperatures equal to or higher than $Tc_2$, since the exchange coupling with the magnetic-domain magnifying layer 1202 is disconnected, the reproducing layer 1201 becomes an in-plane-magnetizing film. Thus, magnetic domains greater than the magnetic domains preserved in the recording layer 1204 can be obtained within the laser beam spot. At that time, the Kerr rotation angle is increased in the reproducing layer 1201 because it has a Curie temperature equal to or higher than 300° C., and a high-quality signal can be obtained because a noise component due to a domain wall moving behind the laser beam is masked by the in-plane-magnetizing film.

As described above, when the optical disk of the present invention is used, the magnetic domain in a portion having a temperature close to the temperature $Tc_3$, which is present substantially in the leading-end portion of the laser beam, can be reproduced while being magnified within he laser beam. Hence, it is possible to obtain a reproduced signal having a sufficiently large amplitude without being influenced by the optical diffraction limit even if the track recording density is increased.

So far, a description has been provided of the movement of a domain wall considering the cross section of a central portion of the track. However, since the actual track has a certain width and also has a temperature gradient in the lateral direction, the movement of the domain wall in this direction must be considered.

FIG. 13A is a cross-sectional view of the optical disk of the present embodiment. The interference layer, the magnetic layer and the protective layer are sequentially laminated on the substrate in the described order, and guide grooves having a rectangular cross section 100 nm deep are formed on the substrate. That is, information is recorded and reproduced using lands 1213 as information tracks, and each track is separated by adjacent grooves 1214. Hence, the magnetic layer laminated on a land 1213 is also separated by adjacent grooves 1214. Actually, the magnetic layer becomes continuous, because a magnetic film is slightly deposited even on step portions. However, since the thickness of the film is much smaller than the thickness of the magnetic film on other portions, the connection at the step portions can be neglected. In the present invention, a state in which respective information tracks are magnetically separated from each other includes such a state. When reverse magnetic domains are formed on the land 1213 at its entire width, as shown in FIG. 13B, domain walls 1212 are formed at boundary portions of the magnetic domains 1211 and 121'. Such domain walls can be easily moved in the direction of the track, because there is no generation/extinction of domain walls at the sides of the domain walls.

Figure 14A:
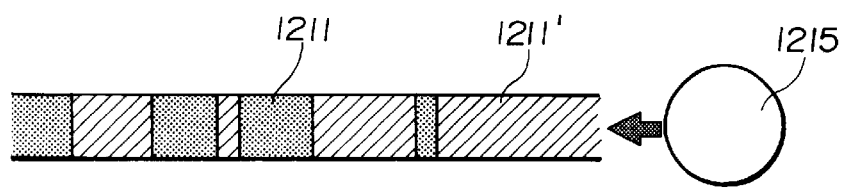
FIGS. 14A through 14I are diagrams illustrating signal reproduction in the third embodiment.
Figure 14B:
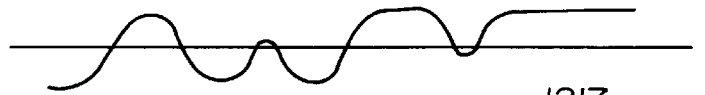

FIGS. 14A through 14I illustrate a manner in which a laser-beam spot moves on a track, as seen from the substrate side. FIG. 14A illustrates an information track and a laser-beam spot 1215. The laser-beam spot 1215 scans the track, in which upward magnetic domains 1211 and downward magnetic domains 1211' are alternately recorded, in the direction of the arrow. At that time, since the spot is not yet projected onto the disk, the magnetic moments in the four compositional layers of the magnetic layer are vertically oriented and are in a state of exchange coupling with each other. Hence, the magnetic domains as shown in FIG. 14A are also present in the reproducing layer 1201. For the purpose of comparison, FIG. 14B illustrates a reproduced waveform when the same magnetic domains as those shown in FIG. 14A are recorded on a conventional optical disk. In FIG. 14B, the amplitude of the reproduced signal becomes smaller as the size of the magnetic domain becomes small compared with the spot size.

Figure 14C:
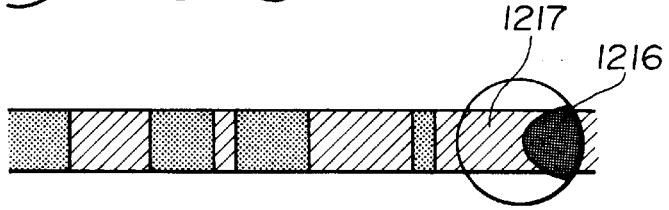
Figure 14D:
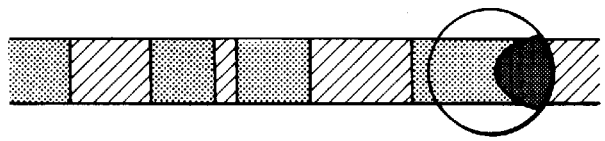
Figure 14E:
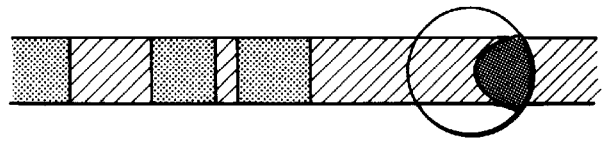

FIGS. 14C–14H illustrate the behavior of the magnetic domains when the laser-beam spot scans the optical disk of the present embodiment. First, FIG. 14C illustrates the behavior of the magnetic domains when the laser-beam spot 1215 reaches the first downward magnetic domain 1211' on the track. Within the spot 1215, reference numeral 1217 represents a portion where the magnetic moment of the reproducing layer 1201 is vertically oriented, i.e., an aperture portion which contributes to signal reproduction. Reference numeral 1216 represents a portion where the temperature of the disk reaches the Curie temperature of the magnetic-domain magnifying layer 1202 to disconnect the exchange coupling, and the reproducing layer 1201 becomes an in-plane-magnetizing film, i.e., a masked portion. That is, the boundary between the aperture portion 1217 and the masked portion 1216 equals the isotherm of the Curie temperature $Tc_2$ of the magnetic-domain magnifying layer 1202. When the spot moves from this state and reaches the position shown in FIG. 14D, the temperature of the domain wall at the position close to the leading-end portion of the spot is raised to the Curie temperature $Tc_3$ of the intermediate layer 1203, and the domain wall in the magnetic-domain magnifying layer 1202 starts to move. By a quick movement of the domain wall, all magnetic domains in the magnetic-domain magnifying layer 1202 and the reproducing layer 1201 within the aperture become upwardly oriented. When the spot further moves to the position shown in FIG. 14E, the temperature of the next domain wall is raised to $Tc_3$, and the domain wall starts to move. As a result, all magnetic domains within the aperture become downwardly oriented.

Figure 14F:
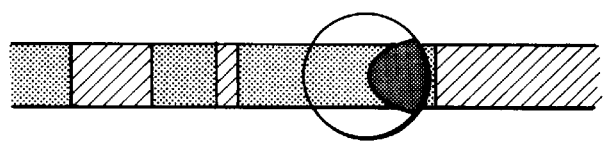
Figure 14G:
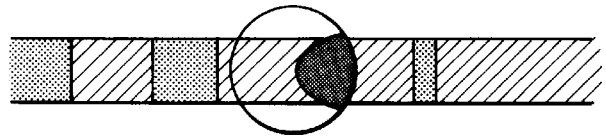
Figure 14H:
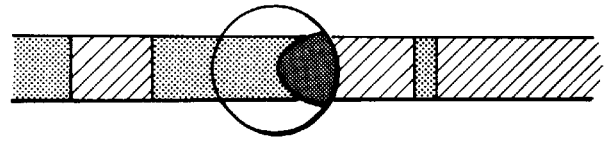
Figure 14:

As the spot further moves, as shown in FIGS. 14F–14H, every time the spot reaches a new domain wall, the domain wall starts to move, and the orientation of all magnetic domains within the aperture is inverted. Hence, a reproduced signal having a maximum amplitude can always be obtained irrespective of the size of the magnetic domain, as shown in FIG. 14I.

Figure 15:
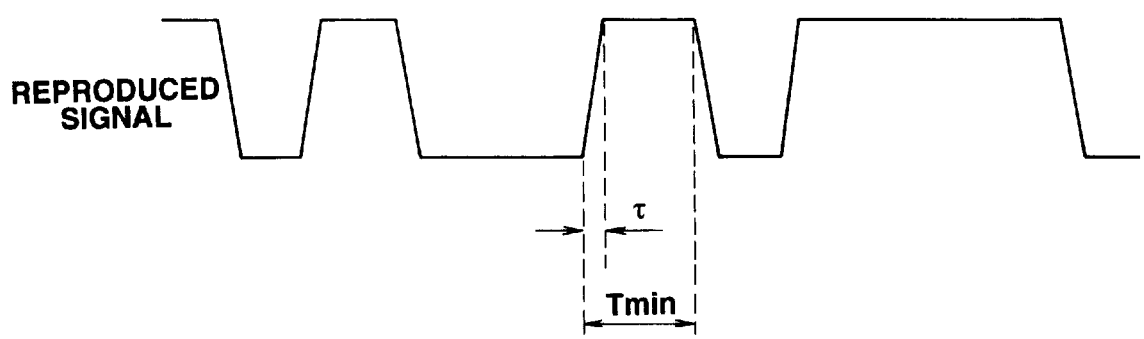
FIG. 15 is a diagram illustrating the waveform of an ordinary reproduced signal.

FIG. 15 is a diagram schematically illustrating the waveform of an ordinary reproduced signal. The rise time τ of the reproduced signal corresponds to the time required for a domain wall to move within the spot. It is necessary to set the recording frequency so that the time τ is smaller than the time $T_{min}$ corresponding to the shortest recording mark length.

When forming the disk of the present embodiment, domain walls can smoothly move by smoothing the surface of the disk by being heated by projecting Ar ions on the surface of the interference film after it has been formed. It is thereby possible to further increase the linear velocity of the disk.

When the guide grooves on the substrate have a U-like shape, the tracks can be magnetically separated by annealing the magnetic layer on the guide groove portions by projecting a high-power laser beam to provide an in-plane-magnetizing film.

Fourth Embodiment

Figure 16:
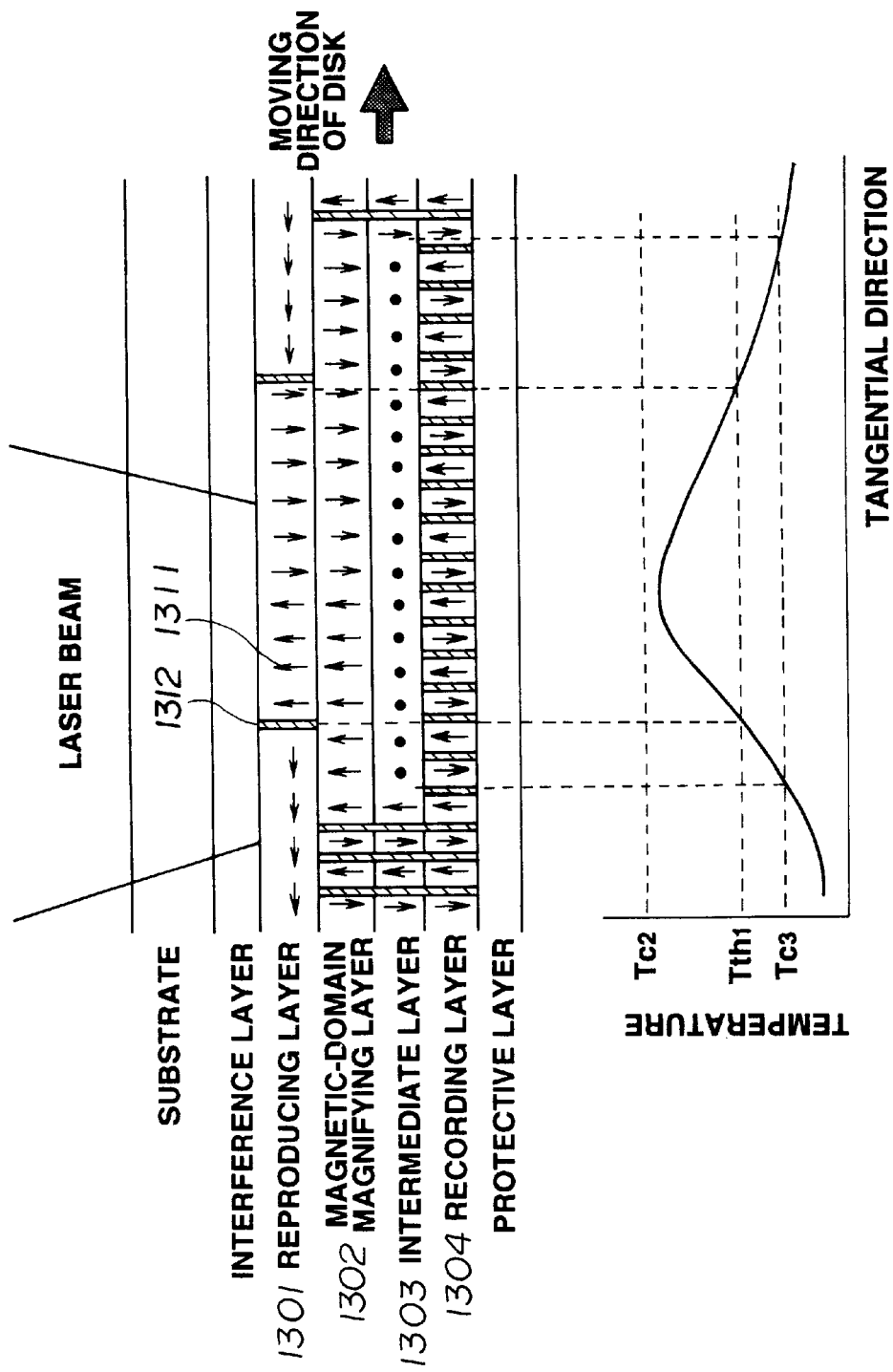
FIGS. 16A and 16B are diagrams illustrating a magnetooptical recording medium and the principle of reproducing information from the medium according to a fourth embodiment of the present invention.

FIGS. 16A and 16B are diagrams illustrating the configuration of a fourth embodiment of the present invention. The fourth embodiment differs from the third embodiment in the following two items.

(1) A reproducing layer 1301 comprises an in-plane-magnetizing film at temperatures lower than $Tth_1$ (a temperature lower than the Curie temperature $Tc_2$ of a magnetic-domain magnifying layer 1302 and equal to or higher than the Curie temperature $Tc_3$ of an intermediate layer 1303). However, when the temperature of the disk is raised to a temperature equal to or higher than $Tth_1$, the direction of the magnetic moment of the reproducing layer 1301 becomes perpendicular to the plane of the magnetic layer caused by exchange coupling with the magnetic-domain magnifying layer 1302.

(2) The Curie temperature $Tc_2$ of the magnetic-domain magnifying layer 1302 is slightly higher than the highest temperature of the disk during a reproducing operation.

Figure 17:
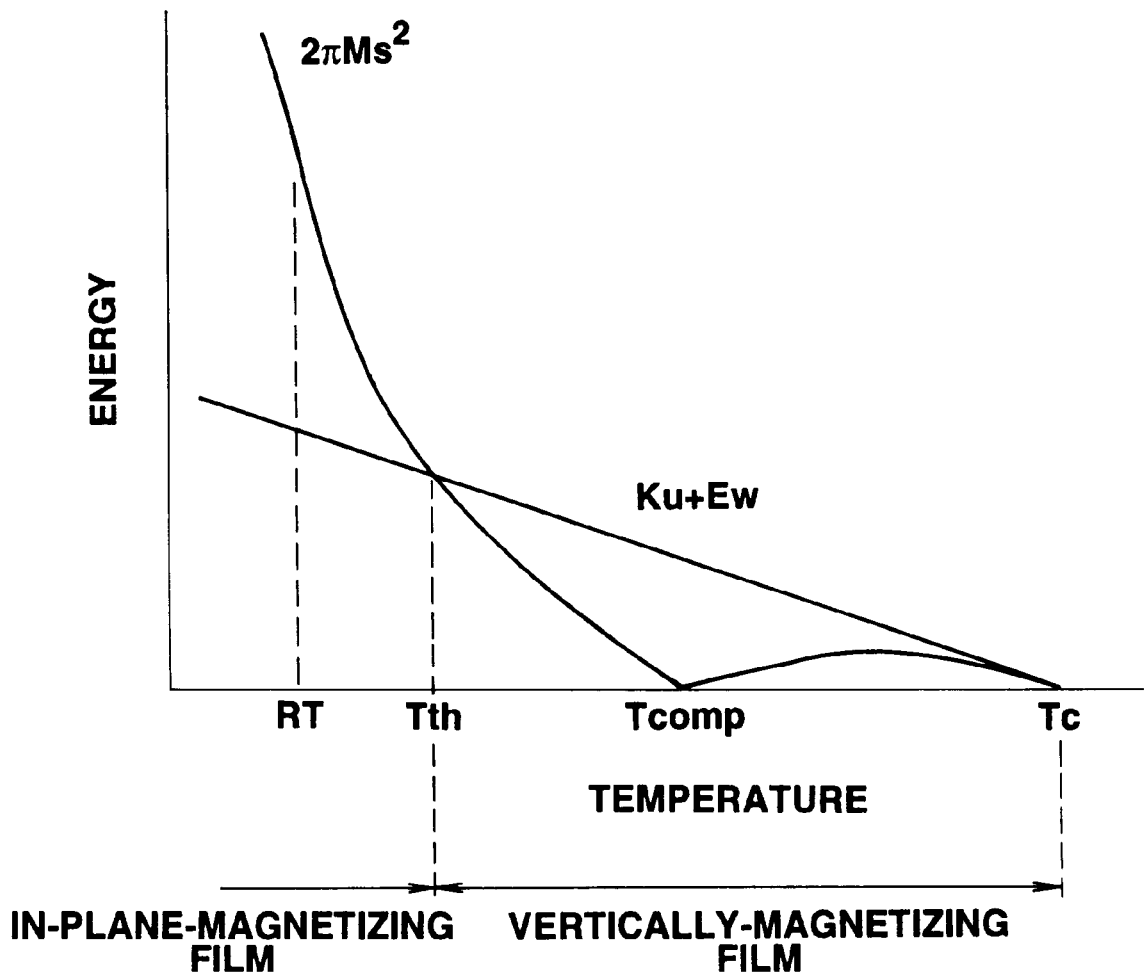
FIG. 17 is a diagram illustrating temperature characteristics of a reproducing layer of the fourth embodiment.

That is, in the present embodiment, the reproducing layer 1301 has a composition having larger saturation magnetization Ms and smaller vertical magnetic anisotropy Ku compared with the third embodiment (Ku>0). At the room temperature, the reproducing layer 1301 comprises an in-plane-magnetizing film influenced by its own demagnetizing field in spite of the exchange coupling force exerted from the magnetic-domain magnifying layer 1302. However, when the temperature of the disk reaches the predetermined temperature $Tth_1$, since the value of Ms is reduced, the direction of the magnetic moment of the reproducing layer 1301 becomes perpendicular to the plane of the magnetic layer caused by the exchange coupling with the magnetic-domain magnifying layer 1302. The value of $Tth_1$ is desirably the temperature of the disk reached when a reproducing light beam is projected, i.e., about 100° C. In order to increase the Kerr rotation angle, the Curie temperature of the reproducing layer 1301 is preferably a high temperature of at least 300° C. For that purpose, it is preferred that the reproducing layer 1301 has a composition such that rare-earth-element sublattice magnetization is dominant. The compensation temperature is not necessarily required to be present, but the reproducing layer 1301 preferably has a compensation temperature between the room temperature and the Curie temperature. More specifically, a composition to have a compensation temperature of at least 200° C. is preferred. In consideration of the foregoing requirements, temperature characteristics of energy in the reproducing layer 1301 are as shown in FIG. 17. In FIG. 17, Ew represents the exchange energy which is exerted from the magnetic-domain magnifying layer 1301 to the reproducing layer 1301. Since the magnetic-domain magnifying layer 1302 comprises a vertically-magnetizing layer, a force is exerted so as to vertically magnetize the reproducing layer 1301 together with Ku. As shown in FIG. 17, at temperatures lower than $Tth_1$, $$2\pi Ms^2 > Ku + Ew.$$

Hence, the direction of the magnetic moment of the reproducing layer 1301 is within the plane of the magnetic layer. If the temperature of the disk is raised to at least $Tth_1$, $$2\pi Ms^2 < Ku + Ew.$$

Hence, the direction of the magnetic moment of the reproducing layer 1301 becomes perpendicular to the plane of the magnetic layer, and magnified information pits are transferred to the reproducing layer 1301 caused by the exchange coupling exerted from the magnetic-domain magnifying layer 1302.

When an information-reproducing light beam is projected from the base side of the magnetic film, a temperature gradient as shown in FIG. 16B is obtained for the center of the data track. As described above, since the direction of the magnetic moment of the reproducing layer 1301 is within the plane of the magnetic layer at temperatures lower than $Tth_1$, the reproducing layer 1301 does not contribute to the Kerr effect, and information present in the lower layers is masked from the side of the reproducing light beam. On the other hand, in portions having temperatures equal to at least $Tth_1$, the direction of the magnetic moment of the reproducing layer 1301 is perpendicular to the plane of the magnetic layer. The direction of the magnetic moment at that time is the same as that of recorded information held in the recording layer 1304 caused by the exchange coupling.

Thus, as shown in FIGS. 16A and 16B, at a portion whose temperature is lower than $Tth_1$, i.e., a part of the leading-end portion of the spot, the reproducing layer 1301 comprises an in-plane-magnetizing layer. Hence, magnetic domains in the recording layer 1304 are masked, and a reproduced signal is obtained from a trailing-end portion of the spot. A description will be provided with reference to FIGS. 18A and 18B in order to clarify a difference in the shape of an aperture within the spot.

Figure 18A:
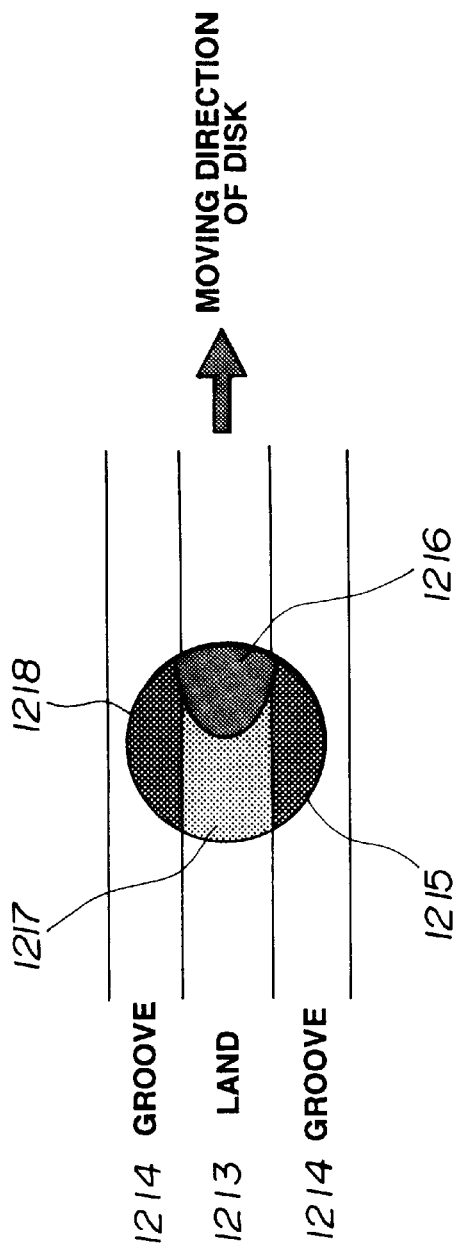
FIG. 18A is a diagram illustrating the behavior of a light spot in the third embodiment.

FIG. 18A is a diagram illustrating the behavior of the spot in the third embodiment. As described above, the region 1216 having temperatures higher than the isotherm of $Tc_2$ within the spot 1215 is the masked region in which the reproducing layer 1201 comprises an in-plane-magnetizing film. The region 1217 having temperatures lower than $Tc_2$ is the aperture region in which all the four compositional layers of the magnetic layer are in a state of exchange coupling. As described above, a signal is reproduced from this region. In the actual disk, the land 1213, serving as an information track, is separated by the grooves 1214, but a magnetic film is also present on the grooves 1214. Since the spot 1215 is also projected onto the grooves 1214, noise may be generated depending on the direction of magnetization within the grooves 1214. This causes no problem when the grooves 1214 have been annealed to provide an in-plane-magnetizing film, or when the magnetization of the grooves 1214 has been initialized to be arranged in the same direction, but will cause a big problem when the magnetization of the grooves 1214 has not been initialized, or when it is intended to utilize the grooves 1214 as tracks by recording another information.

Figure 18B:
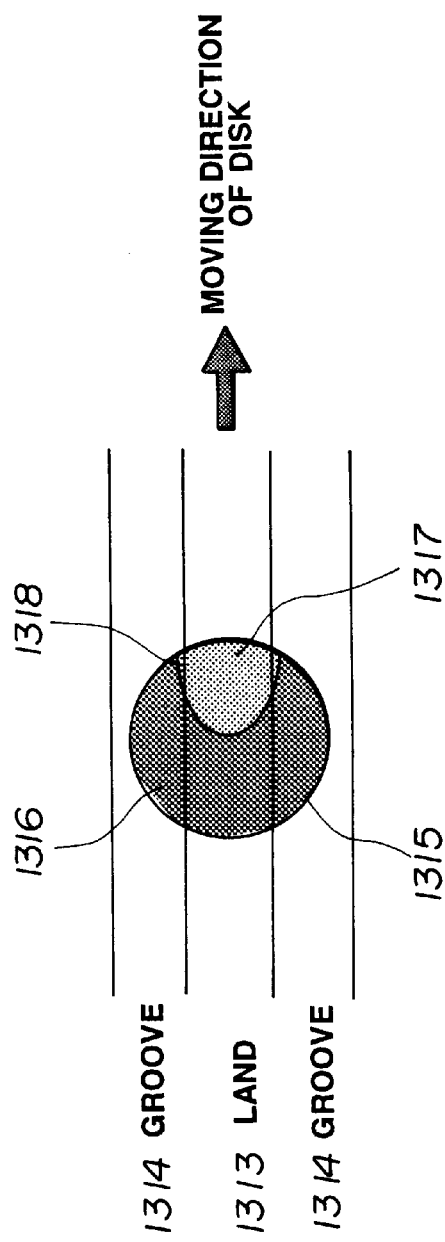
FIG. 18B is a diagram illustrating the behavior of a light spot in the fourth embodiment.

On the other hand, in the above-described fourth embodiment, as shown in FIG. 18B, an aperture 1317 is situated at the trailing-end side of a spot 1315. That is, the reproducing layer 1301 comprises an in-plane-magnetizing film to become a masked region at a portion having temperatures lower than $Tth_1$, and a region having temperatures equal to or higher than $Tth_1$ is in a state of exchange coupling with the magnetic-domain magnifying layer 1302 to become an aperture. A region 1318 of the aperture portion present on grooves 1314 is a very small region. Hence, there is no problem of noise or cross talk from the grooves 1314. In the present embodiment, since a region in which the orientation of magnetic domains is uncertain after the spot starts to be projected until a domain wall starts to move is masked by the reproducing layer 1301, noise is reduced.

Fifth Embodiment

Figures 19A, 19B:
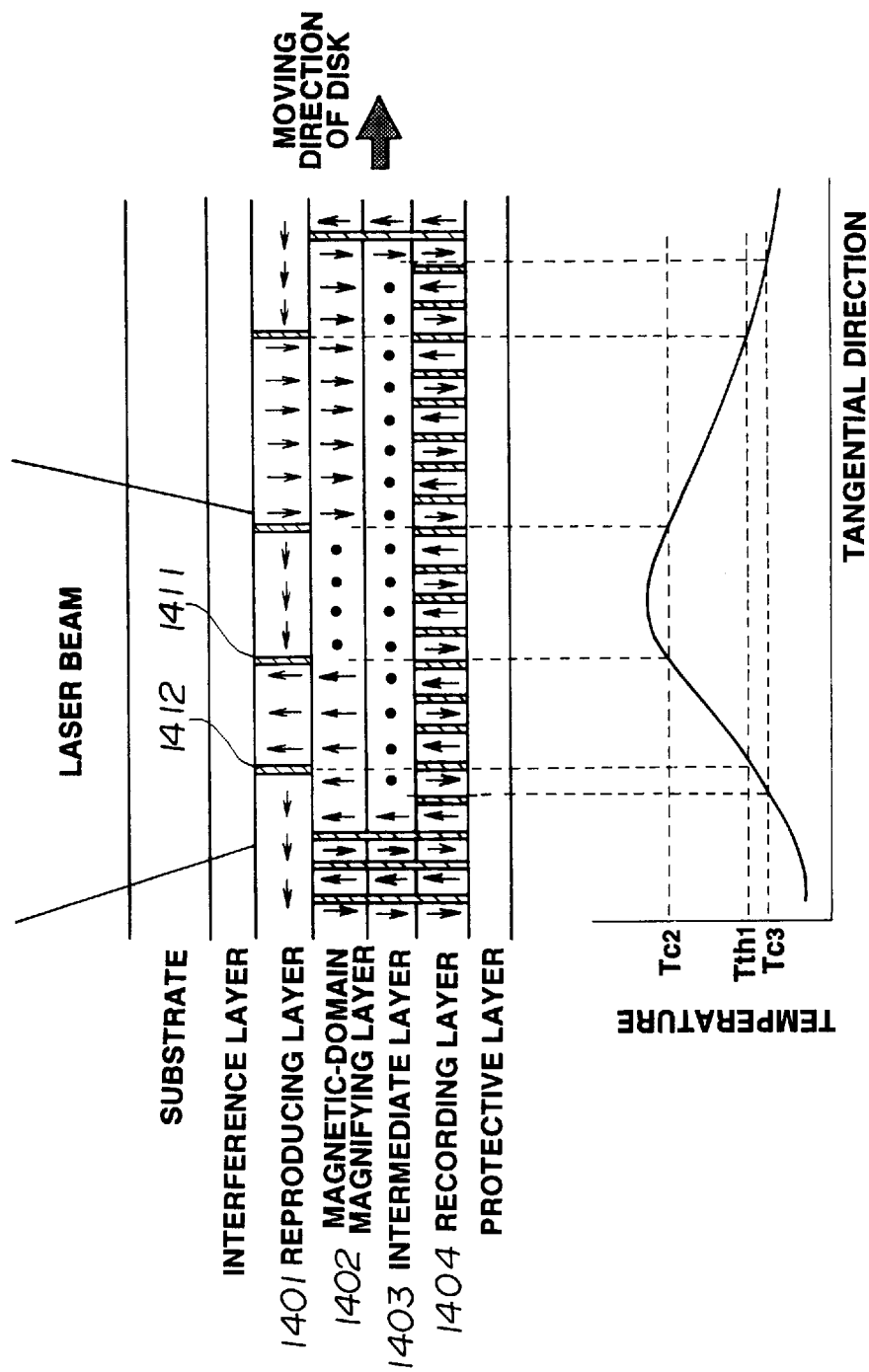
FIGS. 19A and 19B are diagrams illustrating a magnetooptical recording medium and the principle of reproducing information from the medium according to a fifth embodiment of the present invention.

FIGS. 19A and 19B are diagrams illustrating the configuration of a fifth embodiment of the present invention. The present embodiment differs from the fourth embodiment in that the Curie temperature $Tc_2$ of a magnetic-domain magnifying layer 1402 is set to a value lower than that of the magnetic-domain magnifying layer of the fourth embodiment, so that a part of the magnetic-domain magnifying layer 1402 reaches the Curie temperature within the spot caused by irradiation of a reproducing light beam.

In the present embodiment, two masked regions are present within the spot.

(1) At a leading-end portion of the spot, the temperature of the disk is lower than $Tth_1$, and a reproducing layer 1401 comprises an in-plane-magnetizing film because the value of saturation magnetization Ms is large, and a region, in which the direction of magnetization is uncertain until a domain wall starts to move in the magnetic-domain magnifying layer 1402, is masked.

(2) At a trailing-end portion of the spot, the temperature of the disk is equal to or higher than $Tc_2$, and the reproducing layer 1401 comprises an in-plane-magnetizing film because the temperature of the magnetic-domain magnifying layer 1401 reaches the Curie temperature to disconnect the exchange coupling, and magnetic domains, having uncertain orientations, made by domain walls moved from the rear side of the spot are masked.

In the present embodiment, by providing the above-described two masked regions, a signal is reproduced by extracting only a portion including magnified magnetic domains made by moved domain walls, a noise component can be further removed.

Figure 20:
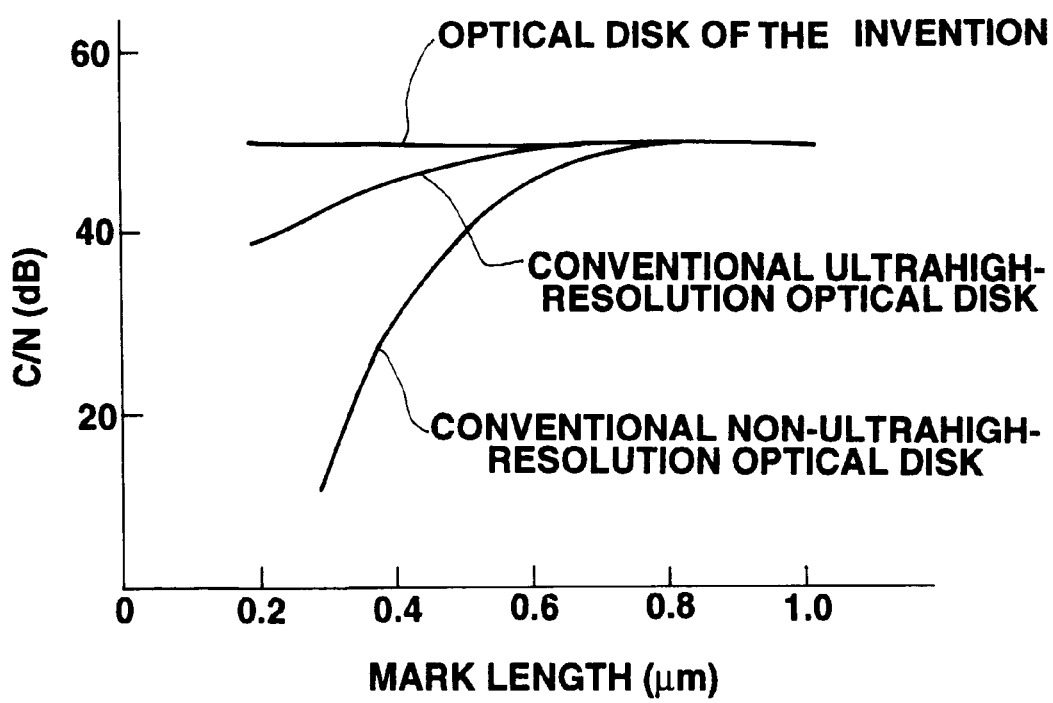
FIG. 20 is a diagram comparing the C/N ratio obtained in the fifth embodiment with the C/N ratios obtained from conventional media.

FIG. 20 illustrates the result of measurement of the C/N ratio for the disk having the configuration of the present embodiment. As shown in FIG. 20, in a conventional optical disk, the C/N ratio greatly decreases when the recording mark length is reduced to about 0.4 μm. This tendency is improved, though insufficiently, by using a conventional ultrahigh-resolution optical disk, but the C/N ratio more or less decreases for smaller mark lengths.

On the other hand, in the result of the same experiment performed using the optical disk of the present embodiment, the linear-density dependency of the C/N ratio is hardly present even for smaller mark lengths.

Sixth Embodiment

FIGS. 21A and 21B are diagrams illustrating the configuration of a sixth embodiment of the present invention. The present embodiment differs from the third embodiment in that a second intermediate layer 1505, having a Curie temperature lower than the Curie temperatures of a reproducing layer 1501 and a magnetic-domain magnifying layer 1502, and higher than the Curie temperature of a first intermediate layer 1503, is added between the reproducing layer 1501 and the magnetic-domain magnifying layer 1502. The magnetic-domain magnifying layer of the third embodiment has the following two functions.

(1) Magnetic domains are magnified by quickly moving domain walls at a portion having temperatures higher than the Curie temperature of the intermediate layer 1503.

(2) The direction of magnetization in the reproducing layer 1501 is made to be within the plane of the layer by disconnecting the exchange coupling with the magnetic-domain magnifying layer 1502 at a portion having temperatures higher than the Curie temperature $Tc_2$.

In the present embodiment, the degree of freedom in the design of films is increased by arranging so that the second intermediate layer 1505 has the above-described function (2). The operation of the disk is the same as in the third embodiment.

Seventh Embodiment

Figures 22A, 22B:
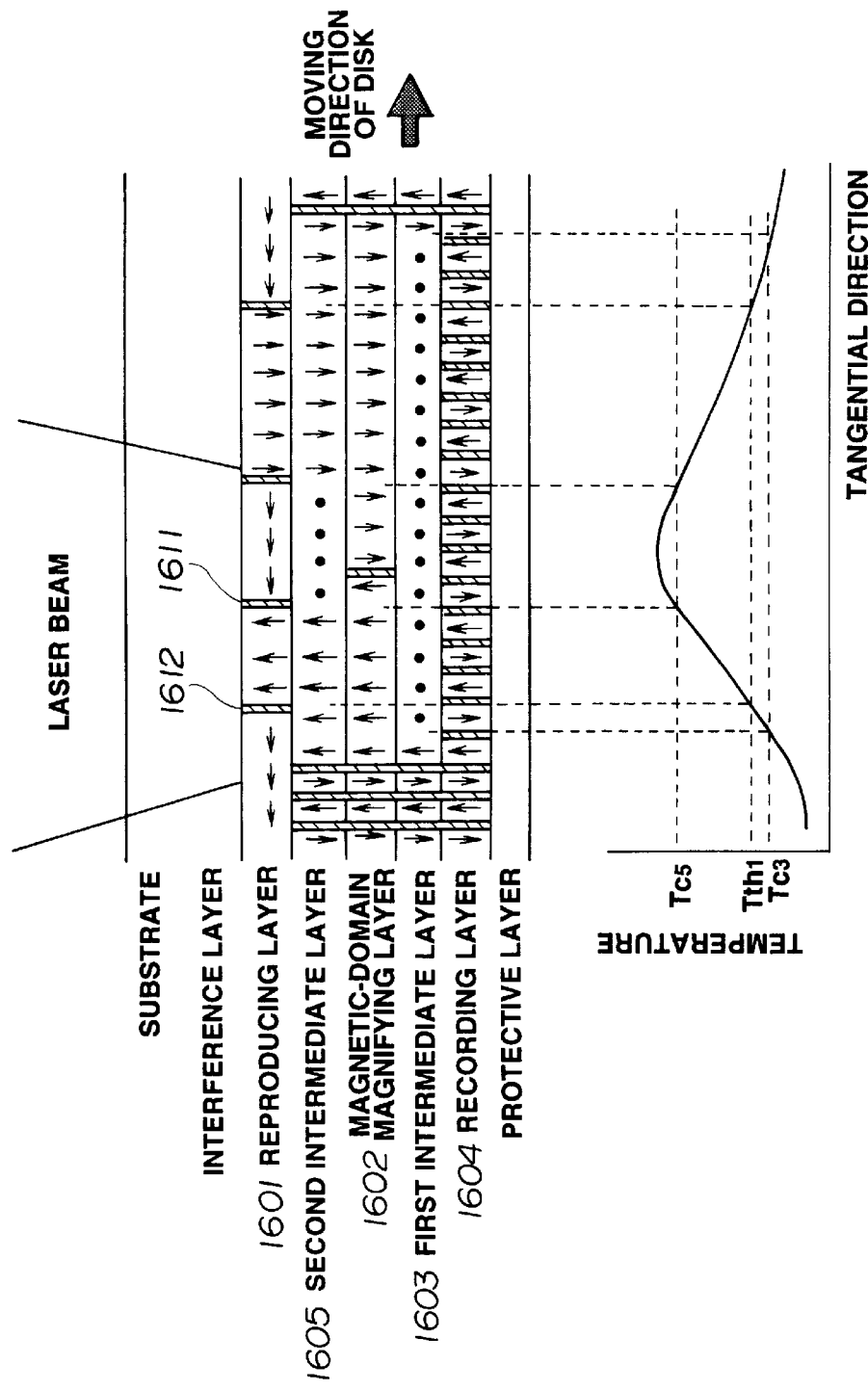
FIGS. 22A and 22B are diagrams illustrating a magnetooptical recording medium and the principle of reproducing information from the medium according to a seventh embodiment of the present invention.

FIGS. 22A and 22B are diagrams illustrating the configuration of a seventh embodiment of the present invention. The present embodiment differs from the fifth embodiment in that a second intermediate layer 1605, having a Curie temperature lower than the Curie temperatures of a reproducing layer 1601 and a magnetic-domain magnifying layer 1602, and higher than the Curie temperature of a first intermediate layer 1603, is added between the reproducing layer 1501 and the magnetic-domain magnifying layer 1502.

In the present embodiment, the degree of freedom in the design of films is increased by arranging so that the second intermediate layer 1605 has the above-described function (2). The operation of the disk is the same as in the fifth embodiment.

Eighth Embodiment

FIGS. 23A and 23B are diagrams illustrating the configuration of an eighth embodiment of the present invention. In the present embodiment, in place of the second intermediate layer in the seventh embodiment, an adjusting layer 1706, having a Curie temperature $Tc_6$ lower than the Curie temperatures of a reproducing layer 1701 and a magnetic-domain magnifying layer 1702, and higher than the Curie temperature of a first intermediate layer 1703, and having large in-plane magnetic anisotropy, is provided. This adjusting layer 1706 has the function of adjusting the exchange coupling energy between the reproducing layer 1701 and the magnetic-domain magnifying layer 1702 in a masked portion, and increasing the masking effect of the reproducing layer 1701.

The adjusting layer 1706 of the present embodiment also has the function of disconnecting the exchange coupling with the reproducing layer 1701 at a portion having temperatures equal to or higher than the Curie temperature $Tc_6$. However, a configuration, in which the above-described functions are allocated to separate magnetic layers, agrees, of course, with the gist of the present invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetooptical recording medium formed of a film and having a plurality of information tracks, each information track comprising:

a first magnetic layer;

a second magnetic layer having a Curie temperature that is lower than that of said first magnetic layer; and a third magnetic layer for storing information having a Curie temperature that is higher than that of said second magnetic layer, wherein the perpendicular magnetic anisotropy of said first magnetic layer is smaller than that of said third magnetic layer, and exchange coupling is substantially disconnected between each of the information tracks.

2. A magnetooptical recording medium formed of a film and having a plurality of information tracks, each information track comprising:

a first magnetic layer;

a second magnetic layer having a Curie temperature that is lower than that of said first magnetic layer;

a third magnetic layer for storing information having a Curie temperature that is higher than that of said second magnetic layer, wherein the perpendicular magnetic anisotropy of said first magnetic layer is smaller than that of said third magnetic layer; and means between information tracks for substantially disconnecting each information track.

3. A magnetooptical recording medium formed of a film and having a plurality of information tracks, each information track comprising:

a substrate;

a first magnetic layer;

a second magnetic layer having a Curie temperature that is lower than that of said first magnetic layer;

a third magnetic layer for storing information, having a Curie temperature that is higher than that of said second magnetic layer; and a fourth magnetic layer, whose Curie temperature is higher than that of said second magnetic layer and lower than that of said first magnetic layer, wherein said first magnetic layer, said fourth magnetic layer, said second magnetic layer and said third magnetic layer are laminated on said substrate in that order, the perpendicular magnetic anisotropy of each of said first and fourth magnetic layers is smaller than that of said third magnetic layer, and exchange coupling is substantially disconnected between each of the information tracks.

4. A magnetooptical recording medium according to claim 3, wherein said fourth magnetic layer has a Curie temperature gradient in the direction of the thickness of that layer so that the Curie temperature decreases toward said second magnetic layer, with the lowest Curie temperature of said fourth magnetic layer being higher than the Curie temperature of said second magnetic layer.

5. A magnetooptical recording medium according to claim 1, wherein each of said first magnetic layer, said second magnetic layer and said third magnetic layer comprises a rare-earth/iron-group element amorphous alloy, wherein the iron-group element is either iron, cobalt, or iron and cobalt.

6. A magnetooptical recording medium according to claim 3, wherein said fourth magnetic layer comprises a rare-earth/iron-group element amorphous alloy, wherein said iron-group element is either iron, cobalt, or iron and cobalt, and said fourth magnetic layer has a composition such that rare-earth element sublattice magnetization is dominant.

7. A magnetooptical recording medium according to claim 1, wherein said first magnetic layer comprises a film that is in-plane magnetizable at room temperature, and which becomes vertically magnetizable when the temperature of said medium is raised.

8. A magnetooptical recording medium according to claim 1, further comprising another magnetic layer, having a Curie temperature that is higher than that of said first magnetic layer, provided adjacent to said first magnetic layer at a side opposite to a side adjacent to said second magnetic layer.

9. A magnetooptical recording medium according to claim 8, wherein said other magnetic layer comprises a film that is vertically magnetizable when in a state in which it is exchange-coupled with said first magnetic layer, and becomes in-plane magnetizable when in a state in which the exchange coupling with said first magnetic layer ceases to exist.

10. A magnetooptical recording medium according to claim 8, wherein said other magnetic layer comprises a film that is in-plane magnetizable at room temperature, and becomes vertically magnetizable when the temperature of said medium is raised.

11. A magnetooptical recording medium according to claim 8, wherein said other magnetic layer comprises a film that is in-plane magnetizable at room temperature, becomes vertically magnetizable at temperatures between the Curie temperature of said first magnetic layer and the Curie temperature of said second magnetic layer, and again becomes in-plane magnetizable at a temperature near the Curie temperature of said first magnetic layer.

12. An information reproducing method for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information and having a Curie temperature that is higher than that of the second magnetic layer, wherein the perpendicular magnetic anisotropy of the first magnetic layer is smaller than that of the third magnetic layer, and exchange coupling is substantially disconnected between each of the information tracks, said method comprising the steps of:

rotating the medium;

projecting a light beam onto the rotating medium from the side of the first magnetic layer;

forming a temperature distribution having a gradient in the direction in which the light beam moves relative to the medium and having a region of temperatures higher than the Curie temperature of the second magnetic layer;

moving a domain wall in the first magnetic layer which comes into the region of temperatures when the medium rotates toward a side having higher temperature in the temperature gradient in the first magnetic layer; and reproducing the information by detecting rays of the light beam.

13. A magnetooptical recording medium according to claim 2, wherein each of said first magnetic layer, said second magnetic layer, and said third magnetic layer comprises a rare-earth/iron group element amorphous alloy, wherein the iron-group element is either iron, cobalt, or iron and cobalt.

14. A magnetooptical recording medium according to claim 2, wherein said first magnetic layer comprises an in-plane magnetizable film at room temperature, and becomes a vertically-magnetizable film when the temperature thereof is raised above room temperature.

15. A magnetooptical recording medium according to claim 2, further comprising a fourth magnetic layer, whose Curie temperature is higher than that of said first magnetic layer, provided adjacent said first magnetic layer at a side opposite to a side adjacent to said second magnetic layer.

16. A magnetooptical recording medium according to claim 3, wherein each of said first magnetic layer, said second magnetic layer, and said third magnetic layer comprises a rare-earth/iron group element amorphous alloy, wherein the iron-group element is either iron, cobalt, or iron and cobalt.

17. A magnetooptical recording medium according to claim 3, wherein said first magnetic layer comprises an in-plane magnetizable film at room temperature, and becomes a vertically-magnetizable film when the temperature thereof is raised above room temperature.

18. A magnetooptical recording medium according to claim 3, further comprising a fifth magnetic layer, whose Curie temperature is higher than that of said first magnetic layer, provided adjacent said first magnetic layer at a side opposite to a side adjacent to said second magnetic layer.

19. An information reproducing method according to claim 12, wherein each of said first magnetic layer, said second magnetic layer, and said third magnetic layer comprises a rare-earth/iron group element amorphous alloy, wherein the iron-group element is either iron, cobalt, or iron and cobalt.

20. An information reproducing method according to claim 12, wherein said first magnetic layer comprises an in-plane magnetizable film at room temperature, and becomes a vertically-magnetizable film when the temperature thereof is raised above room temperature.

21. An information reproducing method according to claim 12, further comprising a fourth layer, whose Curie temperature is higher than that of said first magnetic layer, provided adjacent said first magnetic layer at a side opposite to a side adjacent to said second magnetic layer.

22. An information reproducing method according to claim 12, wherein the time the domain wall passes under a spot formed on the medium by the light beam is shorter than the time during which the medium moves a distance corresponding to the length of the shortest record mark on the medium.

23. An information reproducing method according to claim 12, wherein the moving distance of the domain wall is larger than the radius of a spot formed on the medium by the light beam.

24. An information reproducing method for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information having a Curie temperature that is higher than that of the second magnetic layer, wherein the perpendicular magnetic anisotropy of the first magnetic layer is smaller than that of the third magnetic layer, and between each of the information tracks, a non-magnetic layer or an in-plane magnetic film exists, said method comprising the steps of:

rotating the medium;

projecting a light beam onto the rotating medium from the side of the first magnetic layer;

forming a temperature distribution having a gradient in the direction in which the light beam moves relative to the medium and having a region of temperatures higher than the Curie temperature of the second magnetic layer;

moving a domain wall in the first magnetic layer which comes into the region of temperatures when the medium rotates toward a side having a higher temperature in the temperature gradient in the first magnetic layer; and reproducing the information by detecting reflected rays of the light beam.

25. An information reproducing method according to claim 24, wherein the time the domain wall passes under a spot formed on the medium by the light beam is shorter than the time during which the medium moves a distance corresponding to the length of the shortest record mark on the medium.

26. An information reproducing method according to claim 24, wherein the moving distance of the domain wall is larger than the radius of a spot formed on the medium by the light beam.

27. An information reproducing method according to claim 24, wherein each of said first magnetic layer, said second magnetic layer, and said third magnetic layer comprises a rare-earth/iron group element amorphous alloy, wherein the iron-group element is either iron, cobalt, or iron and cobalt.

28. An information reproducing method according to claim 24, wherein said first magnetic layer comprises an in-plane magnetizable film at room temperature, and becomes a vertically-magnetizable film when the temperature thereof is raised above room temperature.

29. An information reproducing method according to claim 24, further comprising a fourth layer, whose Curie temperature is higher than that of said first magnetic layer, provided adjacent said first magnetic layer at a side opposite to a side adjacent to said second magnetic layer.

30. An information reproducing method for reproducing information from a magnetooptical recording medium comprising a substrate, a first magnetic layer, a second magnetic layer having a Curie temperature that is lower than that of the first magnetic layer, a third magnetic layer for storing information, having a Curie temperature that is higher than that of the second magnetic layer, and a fourth magnetic layer, whose Curie temperature is higher than that of the second magnetic layer and lower than that of the first magnetic layer, wherein the first magnetic layer, the fourth magnetic layer, the second magnetic layer and the third magnetic layer are laminated on the substrate in that order, and the perpendicular magnetic anisotropy of each of the first and fourth magnetic layers is smaller than that of the third magnetic layer, said method comprising the steps of:

rotating the medium;

projecting a light beam onto the rotating medium from the side of the first magnetic layer;

forming a temperature distribution having a gradient in the direction in which the light beam moves relative to the medium and having a region of temperatures higher than the Curie temperature of the second magnetic layer;

moving a domain wall in the first magnetic layer which comes into the region of temperatures when the medium rotates toward a side having a higher temperature in the temperature gradient in the first magnetic layer; and reproducing the information by detecting reflected rays of the light beam.

31. An information reproducing method according to claim 30, wherein the time the domain wall passes under a spot formed on the medium by the light beam is shorter than the time during which the medium moves a distance corresponding to the length of the shortest record mark on the medium.

32. An information reproducing method according to claim 30, wherein the moving distance of the domain wall is larger than the radius of a spot formed on the medium by the light beam.

33. An information reproducing method according to claim 30, wherein each of said first magnetic layer, said second magnetic layer, and said third magnetic layer comprises a rare-earth/iron group element amorphous alloy, wherein the iron-group element is either iron, cobalt, or iron and cobalt.

34. An information reproducing method according to claim 30, wherein said first magnetic layer comprises an in-plane magnetizable film at room temperature, and becomes a vertically-magnetizable film when the temperature thereof is raised above room temperature.

35. An information reproducing method according to claim 30, further comprising a fifth layer, whose Curie temperature is higher than that of said first magnetic layer, provided adjacent said first magnetic layer at a side opposite to a side adjacent to said second magnetic layer.

36. An information reproducing method for reproducing information from a magnetooptical recording medium having an information track which comprises a first magnetic layer, a second magnetic layer having a Curie temperature lower than that of the first magnetic layer, and a third magnetic layer for storing information and having a Curie temperature higher than that of the second magnetic layer, wherein the perpendicular magnetic anisotropy of the first magnetic layer is smaller than that of the third magnetic layer, said method comprising the steps of:

rotating the medium;

projecting a light beam onto the rotating medium from the side of the first magnetic layer;

forming a temperature distribution having a gradient in a direction in which the light beam moves relative to the medium and having a region of temperatures higher than the Curie temperature of the second magnetic layer;

moving a domain wall in the first magnetic layer, which comes into the region of temperatures when the medium rotates toward a side having a higher temperature in the temperature gradient in the first magnetic layer, wherein the domain wall moves substantially only in a direction along the information track; and reproducing the information by detecting reflected rays of the light beam.

37. An information reproducing method according to claim 36, wherein the time the domain wall passes under a spot formed on the medium by the light beam is shorter than the time during which the medium moves a distance corresponding to the length of the shortest record mark on the medium.

38. An information reproducing method according to claim 36, wherein the moving distance of the domain wall is larger than the radius of a spot formed on the medium by the light beam.

39. An information reproducing method according to claim 36, wherein each of said first magnetic layer, said second magnetic layer, and said third magnetic layer comprises a rare-earth/iron group element amorphous alloy, wherein the iron-group element is either iron, cobalt, or iron and cobalt.

40. An information reproducing method according to claim 36, wherein said first magnetic layer comprises an in-plane magnetizable film at room temperature, and becomes a vertically-magnetizable film when the temperature thereof is raised above room temperature.

41. An information reproducing method according to claim 36, further comprising a fourth layer, whose Curie temperature is higher than that of said first magnetic layer, provided adjacent said first magnetic layer at a side opposite to a side adjacent to said second magnetic layer.

42. A magnetooptical recording medium having an information track which comprises:
    a first magnetic layer;
    a second magnetic layer having a Curie temperature lower than that of said first magnetic layer; and
    a third magnetic layer for storing information and having a Curie temperature higher than that of said second magnetic layer,
    wherein the perpendicular magnetic anisotropy of said first magnetic layer is smaller than that of said third magnetic layer, and
    wherein a domain wall formed in said first magnetic layer moves substantially only in a direction along the information track.

43. A magnetooptical recording medium according to claim 42, wherein each of said first magnetic layer, said second magnetic layer, and said third magnetic layer comprises a rare-earth/iron group element amorphous alloy, wherein the iron-group element is either iron, cobalt, or iron and cobalt.

44. A magnetooptical recording medium according to claim 42, wherein said first magnetic layer comprises an in-plane magnetizable film at room temperature, and becomes a vertically-magnetizable film when the temperature thereof is raised above room temperature.

45. A magnetooptical recording medium according to claim 42, further comprising a fourth layer, whose Curie temperature is higher than that of said first magnetic layer, provided adjacent said first magnetic layer at a side opposite to a side adjacent to said second magnetic layer.

46. A recording method for recording information on a magnetooptical recording medium, formed of a film and having a plurality of information tracks, each information track comprising a first magnetic layer, a second magnetic layer whose Curie temperature is lower than that of the first magnetic layer, and a third magnetic layer for storing information whose Curie temperature is higher than that of the second magnetic layer, wherein the perpendicular magnetic anisotropy of the first magnetic layer is smaller than that of the third magnetic layer, and exchange coupling is substantially disconnected between each of the information tracks, said method comprising the steps of:
    rotating the medium;
    projecting a light beam onto the rotating medium; and
    recording information by forming a recording magnetic domain not having a domain wall on a portion of its periphery.

47. A recording method according to claim 46, further comprising the step of forming the recording magnetic domain across one of the information tracks.

48. A recording method according to claim 46, wherein each of said first magnetic layer, said second magnetic layer, and said third magnetic layer comprises a rare-earth/iron group element amorphous alloy, wherein the iron-group element is either iron, cobalt, or iron and cobalt.

49. A recording method according to claim 46, wherein said first magnetic layer comprises an in-plane magnetizable film at room temperature, and becomes a vertically-magnetizable film when the temperature thereof is raised above room temperature.

50. A recording method according to claim 46, further comprising a fourth layer, whose Curie temperature is higher than that of said first magnetic layer, provided adjacent said first magnetic layer at a side opposite to a side adjacent to said second magnetic layer.

51. An information reproducing apparatus for reproducing information from a magnetooptical recording medium formed of a film and having a plurality of information tracks, each information track comprising a first magnetic layer, a second magnetic layer whose Curie temperature is lower than that of the first magnetic layer, and a third magnetic layer for storing information whose Curie temperature is higher than that of the second magnetic layer, wherein the perpendicular magnetic anisotropy of the first magnetic layer is smaller than that of the third magnetic layer, and the exchange coupling is substantially disconnected between each of the information tracks, said apparatus comprising:
    means for rotating the medium;
    means for projecting a light beam onto the rotating medium from the side of the first magnetic layer;
    means for forming a temperature distribution having a gradient in the direction in which the light beam moves relative to the medium having a region of temperatures higher than the Curie temperature of the second magnetic layer;
    means for moving a domain wall in the first magnetic layer which comes into the region of temperatures when the medium rotates toward a side having a higher temperature in the temperature gradient in the first magnetic layer;
    means for reproducing the information by detecting reflected rays of the light beam; and
    heating means for heating the medium and forming the temperature distribution, said heating means being provided separately from said light beam projecting means.

52. An information reproducing apparatus according to claim 51, wherein each of said first magnetic layer, said second magnetic layer, and said third magnetic layer comprises a rare-earth/iron group element amorphous alloy, wherein the iron-group element is either iron, cobalt, or iron and cobalt.

53. An information reproducing apparatus according to claim 51, wherein said first magnetic layer comprises an in-plane magnetizable film at room temperature, and becomes a vertically-magnetizable film when the temperature thereof is raised above room temperature.

54. An information reproducing apparatus according to claim 51, said medium further comprising a fourth layer, whose Curie temperature is higher than that of said first magnetic layer, provided adjacent said first magnetic layer at a side opposite to a side adjacent to said second magnetic layer.

55. An information reproducing apparatus for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information having a Curie temperature that is higher than that of the second magnetic layer, wherein the perpendicular magnetic anisotropy of the first magnetic layer is smaller than that of the third magnetic layer, and between each of the information tracks, a non-magnetic layer or an in-plane magnetic film exists, said apparatus comprising:

means for rotating the medium;

means for projecting a light beam onto the rotating medium from the side of the first magnetic layer;

means for forming a temperature distribution having a gradient in the direction in which the light beam moves relative to the medium having a region of temperatures higher than the Curie temperature of the second magnetic layer;

means for moving a domain wall in the first magnetic layer which comes into the region of temperatures when the medium rotates toward a side having higher temperature in the temperature gradient in the first magnetic layer;

means for reproducing the information by detecting reflected rays of the light beam; and heating means for heating the medium and forming the temperature distribution, said heating means being provided separately from said light beam projecting means.

56. An information reproducing apparatus according to claim 55, wherein each of said first magnetic layer, said second magnetic layer, and said third magnetic layer comprises a rare-earth/iron group element amorphous alloy, wherein the iron-group element is either iron, cobalt, or iron and cobalt.

57. An information reproducing apparatus according to claim 55, wherein said first magnetic layer comprises an in-plane magnetizable film at room temperature, and becomes a vertically-magnetizable film when the temperature thereof is raised above room temperature.

58. An information reproducing apparatus according to claim 55, said medium further comprising a fourth layer, whose Curie temperature is higher than that of said first magnetic layer, provided adjacent said first magnetic layer at a side opposite to a side adjacent to said second magnetic layer.

59. An information reproducing apparatus for reproducing information from a magnetooptical recording medium comprising a substrate, a first magnetic layer, a second magnetic layer having a Curie temperature that is lower than that of the first magnetic layer, a third magnetic layer for storing information, having a Curie temperature that is higher than that of the second magnetic layer, and a fourth magnetic layer, whose Curie temperature is higher than that of the second magnetic layer and lower than that of the first magnetic layer, wherein the first magnetic layer, the fourth magnetic layer, the second magnetic layer and the third magnetic layer are laminated on the substrate in that order, and the perpendicular magnetic anisotropy of each of the first and fourth magnetic layers is smaller than that of the third magnetic layer, said apparatus comprising:

means for rotating the medium;

means for projecting a light beam onto the rotating medium from the side of the first magnetic layer;

means for forming a temperature distribution having a gradient in the direction in which the light beam moves relative to the medium having a region of temperatures higher than the Curie temperature of the second magnetic layer;

means for moving a domain wall in the first magnetic layer which comes into the region of temperatures when the medium rotates toward a side having higher temperature in the temperature gradient in the first magnetic layer;

means for reproducing the information by detecting reflected rays of the light beam; and heating means for heating the medium and forming the temperature distribution, said heating means being provided separately from said light beam projecting means.

60. An information reproducing apparatus according to claim 59, wherein each of said first magnetic layer, said second magnetic layer, and said third magnetic layer comprises a rare-earth/iron group element amorphous alloy, wherein the iron-group element is either iron, cobalt, or iron and cobalt.

61. An information reproducing apparatus according to claim 59, wherein said first magnetic layer comprises an in-plane magnetizable film at room temperature, and becomes a vertically-magnetizable film when the temperature thereof is raised above room temperature.

62. An information reproducing apparatus according to claim 59, said medium further comprising a fifth layer, whose Curie temperature is higher than that of said first magnetic layer, provided adjacent said first magnetic layer at a side opposite to a side adjacent to said second magnetic layer.

63. An information reproducing apparatus for reproducing information from a magnetooptical recording medium having an information track which comprises a first magnetic layer, a second magnetic layer having a Curie temperature lower than that of the first magnetic layer, and a third magnetic layer for storing information and having a Curie temperature higher than that of the second magnetic layer, wherein the perpendicular magnetic anisotropy of the first magnetic layer is smaller than that of the third magnetic layer, said apparatus comprising:

means for rotating the medium;

means for projecting a light beam onto the rotating medium from the side of the first magnetic layer;

means for forming a temperature distribution having a gradient in the direction in which the light beam moves relative to the medium having a region of temperatures higher than the Curie temperature of the second magnetic layer;

means for moving a domain wall in the first magnetic layer, which comes into the region of temperatures when the medium rotates toward a side having a higher temperature in the temperature gradient in the first magnetic layer, wherein the domain wall moves substantially only in a direction along the information track;

means for reproducing the information by detecting reflected rays of the light beam; and heating means for heating the medium and forming the temperature distribution, said heating means being provided separately from said light beam projecting means.

64. An information reproducing apparatus according to claim 63, wherein each of said first magnetic layer, said second magnetic layer, and said third magnetic layer comprises a rare-earth/iron group element amorphous alloy, wherein the iron-group element is either iron, cobalt, or iron and cobalt.

65. An information reproducing apparatus according to claim 63, wherein said first magnetic layer comprises an in-plane magnetizable film at room temperature, and becomes a vertically-magnetizable film when the temperature thereof is raised above room temperature.

66. An information reproducing apparatus according to claim 63, said medium comprising a fourth layer, whose Curie temperature is higher than that of said first magnetic layer, provided adjacent said first magnetic layer at a side opposite to a side adjacent to said second magnetic layer.

67. An information reproducing method for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information and having a Curie temperature that is higher than that of the second magnetic layer, wherein the perpendicular magnetic anisotropy of the first magnetic layer is smaller than that of the third magnetic layer, and exchange coupling is substantially disconnected between each of the information tracks, said method comprising the steps of:

projecting a light beam onto the medium from the side of the first magnetic layer;

moving the light beam relative to the medium;

forming a temperature distribution having a gradient in the direction in which the light beam moves relative to the medium and having a region of temperatures higher than the Curie temperature of the second magnetic layer;

moving a domain wall in the first magnetic layer which comes into the region of temperatures toward a side having a higher temperature in the temperature gradient in the first magnetic layer; and reproducing the information by detecting reflected rays of the light beam.

68. An information reproducing method according to claim 67, wherein a non-magnetic layer or an in-plane magnetic film exists between each of the information tracks in the direction of the information tracks in the magnetooptical recording medium.

69. An information reproducing method according to claim 67, wherein each of the first magnetic layer, the second magnetic layer, and the third magnetic layer comprises a rare-earth/iron group element amorphous alloy, wherein the iron-group element is either iron, cobalt, or iron and cobalt.

70. An information reproducing method according to claim 67, wherein the first magnetic layer comprises an in-plane magnetizable film at room temperature, and becomes a vertically-magnetizable film when the temperature thereof is raised above room temperature.

71. An information reproducing method according to claim 67, further comprising a fourth magnetic layer, whose Curie temperature is higher than that of the first magnetic layer, provided adjacent to the first magnetic layer at a side opposite to a side of the first magnetic layer that is adjacent to the second magnetic layer.

72. An information reproducing method according to claim 67, wherein the time the domain wall passes under a spot formed on the medium by the light beam is shorter than the time during which the light beam moves a distance relative to the medium corresponding to the length of the shortest record mark on the medium.

73. An information reproducing method according to claim 67, wherein the moving distance of the domain wall is larger than the radius of a spot formed on the medium by the light beam.

74. An information reproducing method for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information and having a Curie temperature that is higher than that of the second magnetic layer, wherein the perpendicular magnetic anisotropy of the first magnetic layer is smaller than that of the third magnetic layer, said method comprising the steps of:

projecting a light beam onto the medium from the side of the first magnetic layer;

moving the light beam relative to the medium;

forming a temperature distribution having a gradient in the direction in which the light beam moves relative to the medium and having a region of temperatures higher than the Curie temperature of the second magnetic layer;

moving a domain wall in the first magnetic layer which comes into the region of temperatures toward a side having a higher temperature in the temperature gradient in the first magnetic layer, wherein the domain wall moves substantially only in a direction along the information track; and reproducing the information by detecting reflected rays of the light beam.

75. An information reproducing method according to claim 74, wherein the time the domain wall passes under a spot formed on the medium by the light beam is shorter than the time during which the light beam moves a distance relative to the medium corresponding to the length of the shortest record mark on the medium.

76. An information reproducing method according to claim 74, wherein the moving distance of the domain wall is larger than the radius of a spot formed on the medium by the light beam.

77. An information reproducing method according to claim 74, wherein each of the first magnetic layer, the second magnetic layer, and the third magnetic layer comprises a rare-earth/iron group element amorphous alloy, wherein the iron-group element is either iron, cobalt, or iron and cobalt.

78. An information reproducing method according to claim 74, wherein the first magnetic layer comprises an in-plane magnetizable film at room temperature, and becomes a vertically-magnetizable film when the temperature thereof is raised above room temperature.

79. An information reproducing method according to claim 74, further comprising a fourth magnetic layer, whose Curie temperature is higher than that of the first magnetic layer, provided adjacent to the first magnetic layer at a side opposite to a side of the first magnetic layer that is adjacent to the second magnetic layer.

80. A recording method for recording information from a magnetooptical recording medium, formed of a film and having a plurality of information tracks, each information track comprising a first magnetic layer, a second magnetic layer having a Curie temperature that is lower than that of the first magnetic layer, and a third magnetic layer for storing information and having a Curie temperature that is higher than that of the second magnetic layer, wherein the perpendicular magnetic anisotropy of the first magnetic layer is smaller than that of the third magnetic layer, and exchange coupling is substantially disconnected between each of the information tracks, said method comprising the steps of:

projecting a light beam onto the medium from the side of the first magnetic layer;

moving the light beam relative to the medium; and recording information by forming a recording magnetic domain not having a domain wall on a portion of its periphery.

81. A recording method according to claim 80, further comprising the step of forming the recording magnetic domain across one of the information tracks.

82. A recording method according to claim 80, wherein each of the first magnetic layer, the second magnetic layer, and the third magnetic layer comprises a rare-earth/iron group element amorphous alloy, wherein the iron-group element is either iron, cobalt, or iron and cobalt.

83. A recording method according to claim 80, wherein the first magnetic layer comprises an in-plane magnetizable film at room temperature, and becomes a vertically-magnetizable film when the temperature thereof is raised above room temperature.

84. A recording method according to claim 80, further comprising a fourth magnetic layer, whose Curie temperature is higher than that of the first magnetic layer, provided adjacent to the first magnetic layer at a side opposite to a side of the first magnetic layer that is adjacent to the second magnetic layer.

85. An information reproducing apparatus for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information and having a Curie temperature that is higher than that of the second magnetic layer, wherein the perpendicular magnetic anisotropy of the first magnetic layer is smaller than that of the third magnetic layer, and exchange coupling is substantially disconnected between each of the information tracks, said apparatus comprising:

means for projecting a light beam onto the medium from the side of the first magnetic layer;

means for moving the first beam relative to the medium;

heating means for heating the medium and forming a temperature distribution having a gradient in the direction in which the light beam moves relative to the medium and having a region of temperatures higher than the Curie temperature of the second magnetic layer, wherein said heating means being provided separately from said light beam projecting means and the temperature distribution cause a domain wall to move in the first magnetic layer which comes into the region of temperatures toward a side having a higher temperature in the temperature gradient in the first magnetic layer; and means for reproducing the information by detecting reflected rays of the light beam.

86. An information reproducing apparatus according to claim 85, wherein a non-magnetic layer or an in-plane magnetic film exists between each of the information tracks in the direction of the information tracks in the magnetooptical recording medium.

87. An information reproducing apparatus according to claim 85, wherein each of the first magnetic layer, the second magnetic layer, and the third magnetic layer comprises a rare-earth/iron group element amorphous alloy, wherein the iron-group element is either iron, cobalt, or iron and cobalt.

88. An information reproducing apparatus according to claim 85, wherein the first magnetic layer comprises an in-plane magnetizable film at room temperature, and becomes a vertically-magnetizable film when the temperature thereof is raised above room temperature.

89. An information reproducing apparatus according to claim 85, wherein the medium further comprises a fourth magnetic layer, whose Curie temperature is higher than that of the first magnetic layer, provided adjacent to the first magnetic layer at a side opposite to a side of the first magnetic layer that is adjacent to the second magnetic layer.

90. An information reproducing apparatus for reproducing information from a magnetooptical recording medium formed of a film and having a plurality of information tracks, each information track comprising a first magnetic layer, a second magnetic layer having a Curie temperature that is lower than that of the first magnetic layer, and a third magnetic layer for storing information and having a Curie temperature that is higher than that of the second magnetic layer, wherein the perpendicular magnetic anisotropy of the first magnetic layer is smaller than that of the third magnetic layer, said apparatus comprising:

means for projecting a light beam onto the medium from the side of the first magnetic layer;

means for moving the light beam relative to the medium;

heating means for heating the medium and forming a temperature distribution having a gradient in the direction in which the light beam moves relative to the medium and having a region of temperatures higher than the Curie temperature of the second magnetic layer, wherein said heating means being provided separately from said light beam projecting means and the temperature distribution cause a domain wall to move in the first magnetic layer which comes into the region of temperatures toward a side having a higher temperature in the temperature gradient in the first magnetic layer, and the domain wall moves substantially only in a direction along the information track; and means for reproducing the information by detecting reflected rays of the light beam.

91. An information reproducing apparatus according to claim 90, wherein each of the first magnetic layer, the second magnetic layer, and the third magnetic layer comprises a rare-earth/iron group element amorphous alloy, wherein the iron-group element is either iron, cobalt, or iron and cobalt.

92. An information reproducing apparatus according to claim 90, wherein the first magnetic layer comprises an in-plane magnetizable film at room temperature, and becomes a vertically-magnetizable film when the temperature thereof is raised above room temperature.

93. An information reproducing apparatus according to claim 90, wherein the medium comprises a fourth magnetic layer, whose Curie temperature is higher than that of the first magnetic layer, provided adjacent to the first magnetic layer at a side opposite to a side of the first magnetic layer that is adjacent to the second magnetic layer.

* * * * *

UNITED STATES PATENT AND TRADEMARK OFFICE
CERTIFICATE OF CORRECTION

PATENT NO.  : 6,027,825

DATED       : February 22, 2000

INVENTOR(S) : TSUTOMU SHIRATORI ET AL.

It is certified that error appears in the above-identified patent and that said Letters Patent is hereby corrected as shown below:

ON THE TITLE PAGE AT [54] ABSTRACT

Line 9, "walls" should read --wall--.

COLUMN 3

Line 23 "FIG. 3A" should read --FIG. 3A is--.

COLUMN 8

Line 54, "thick" should read --thick,--;
Line 58, "thick" should read --thick,--;
Line 60, "thick" should read --thick,--.

COLUMN 11

Line 38, "was" should read --were--.

COLUMN 12

Line 59, "efficient" should read --efficiently--.

COLUMN 13

Line 15, "thick" should read --thick,--;
Line 16, "thick" should read --thick,--;
Line 46, "polarising" should read --polarizing--.

COLUMN 14

Line 11, "was" should read --were--.

COLUMN 15

Line 65, "a" should be deleted.

COLUMN 18

Line 50, "he" should read --the--.

UNITED STATES PATENT AND TRADEMARK OFFICE
CERTIFICATE OF CORRECTION

PATENT NO. : 6,027,825

DATED : February 22, 2000

INVENTOR(S) : TSUTOMU SHIRATORI ET AL.

It is certified that error appears in the above-identified patent and that said Letters Patent is hereby corrected as shown below:

<u>COLUMN 19</u>

Line 13, "121'." should read --1211'.--.

Signed and Sealed this

Seventeenth Day of April, 2001

Attest:

NICHOLAS P. GODICI

Attesting Officer      Acting Director of the United States Patent and Trademark Office